United States Patent
Uehara et al.

(10) Patent No.: US 7,613,885 B2
(45) Date of Patent: Nov. 3, 2009

(54) CACHE COHERENCY CONTROL METHOD, CHIPSET, AND MULTI-PROCESSOR SYSTEM

(75) Inventors: Keitaro Uehara, Kokubunji (JP); Jun Okitsu, Kokubunji (JP); Yoshiki Murakami, Hadano (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 11/513,378

(22) Filed: Aug. 31, 2006

(65) Prior Publication Data

US 2007/0156972 A1    Jul. 5, 2007

(30) Foreign Application Priority Data

Jan. 4, 2006   (JP) ............. 2006-000028

(51) Int. Cl.
*G06F 12/00* (2006.01)
(52) U.S. Cl. ............. 711/146; 711/147; 711/148; 711/153
(58) Field of Classification Search ............ 711/141, 711/146, 147, 148, 153
See application file for complete search history.

(56) References Cited

U.S. PATENT DOCUMENTS 6,901,485 B2 *   5/2005   Arimilli et al. ............. 711/135

2003/0177317 A1 *   9/2003   Anderson et al. ........... 711/146

FOREIGN PATENT DOCUMENTS

JP       10-222423        8/1998

OTHER PUBLICATIONS

"Implementation of Mission Critical Linux on ES 700 " Unisys Technology Review, Feb. 2005.pp. 56-69.
Origin ccNUMA Servers True Scalability with a Difference, Silicon Graphics Computer Systems, 1999.
"The SGI Origin: AccNUMA Highly Scalable Server" by Laudon, et al., 1998 (with English translation).

* cited by examiner

*Primary Examiner*—Christian P Chace
*Assistant Examiner*—Mehdi Namazi
(74) *Attorney, Agent, or Firm*—Brundidge & Stanger, P.C.

(57) ABSTRACT

In a multi-processor system, counting snoop results bottlenecks the broadcast-based snoop protocol. The directory-based protocol delays the latency when remote node caches data. There is a need for shortening the memory access latency using a snoop and cache copy tag information. When the local node's cache copy tag information is available, the memory access latency can be shortened by omitting a process to count snoop results. When memory position information is used to update the cache copy tag during cache replacement, it is possible to increase a ratio to hit a copy tag during reaccess from the local node.

17 Claims, 20 Drawing Sheets

| SYSTEM TRANSACTION TYPE | VARIATION | PATH TO BE PASSED | DESTINATION |
|---|---|---|---|
| SNOOP REQUEST | READ, READ INVALIDATE | TRANSACTION TRANSMISSION PATH 560, TRANSACTION RECEPTION PATH 570 | CACHE COPY TAG MANAGEMENT UNIT 215, PROCESSOR BUS 120 |
| SNOOP RESULT | OK, HIT, HITM | SNOOP RESULT 630, TRANSACTION RECEPTION PATH 570 | SNOOP RESULT COUNT AND DATA RESPONSE CONTROL UNIT 240 |
| MEMORY READ REQUEST | | TRANSACTION TRANSMISSION PATH 560, MEMORY REQUEST PATH 580 | MEMORY UNIT 300 |
| MEMORY WRITE REQUEST | | TRANSACTION TRANSMISSION PATH 560, MEMORY REQUEST PATH 580 | MEMORY UNIT 300 |
| DATA RESPONSE | MEMORY, INTER-CACHE TRANSFER | MEMORY RESPONSE PATH 590, TRANSACTION RECEPTION PATH 570 | PROCESSOR BUS 120 |

FIG. 4
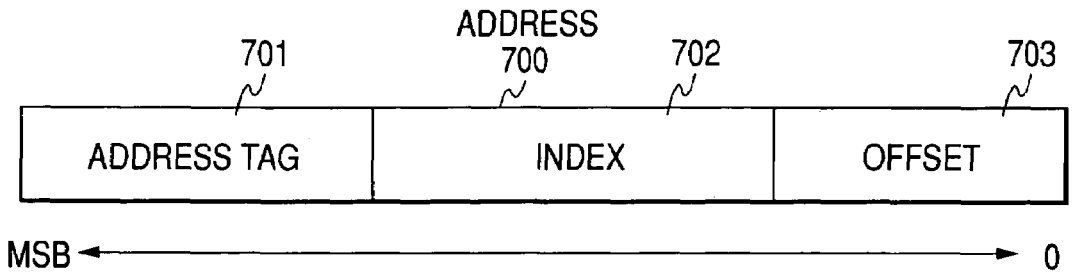
MSB ← → 0
FIG. 5
| I | INVALID | NO CACHE IS PROVIDED. |
|---|---------|------------------------|
| S | SHARED  | SHARED CACHE IS PROVIDED (READ ONLY). |
| E | EXCLUSIVE | EXCLUSIVE CACHE IS PROVIDED (REWRITABLE). |
FIG. 6
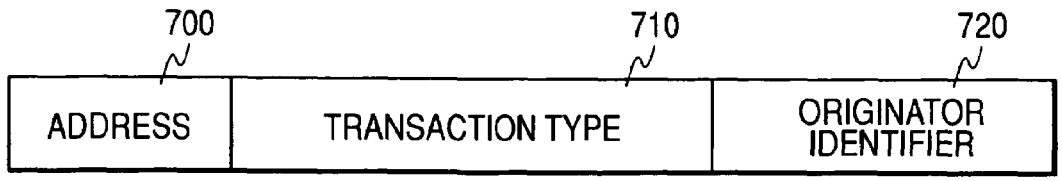

FIG. 7

| BRL | READ | READS DATA INTO CACHE. |
|---|---|---|
| BRIL | READ INVALIDATE | READS DATA INTO CACHE TO REWRITE DATA. |

FIG. 8

| BWBL | WRITE-BACK | WRITES REWRITTEN CACHE DATA BACK TO MEMORY. |
|---|---|---|
| BCR | CLEAN REPLACE | EXCLUDES UNREWRITTEN DATA FROM THE CACHE. |

FIG. 9

| OK | NO CACHE IS PROVIDED OR THE CACHE, ONCE PROVIDED, IS NOW ISCARDED. |
|---|---|
| HIT | A CLEAN CACHE COPY IS PROVIDED. |
| HITM | THE MOST RECENT REWRITTEN CACHE IS MAINTAINED. |

FIG. 10

| SYSTEM TRANSACTION TYPE | VARIATION | PATH TO BE PASSED | DESTINATION |
|---|---|---|---|
| SNOOP REQUEST | READ, READ INVALIDATE | TRANSACTION TRANSMISSION PATH 560, TRANSACTION RECEPTION PATH 570 | CACHE COPY TAG MANAGEMENT UNIT 215, PROCESSOR BUS 120 |
| SNOOP RESULT | OK, HIT, HITM | SNOOP RESULT 630, TRANSACTION RECEPTION PATH 570 | SNOOP RESULT COUNT AND DATA RESPONSE CONTROL UNIT 240 |
| MEMORY READ REQUEST | | TRANSACTION TRANSMISSION PATH 560, MEMORY REQUEST PATH 580 | MEMORY UNIT 300 |
| MEMORY WRITE REQUEST | | TRANSACTION TRANSMISSION PATH 560, MEMORY REQUEST PATH 580 | MEMORY UNIT 300 |
| DATA RESPONSE | MEMORY, INTER-CACHE TRANSFER | MEMORY RESPONSE PATH 590, TRANSACTION RECEPTION PATH 570 | PROCESSOR BUS 120 |

FIG. 11

| # | ITEM | PROTOCOL ACCORDING TO THE INVENTION | BROADCAST-BASED SNOOP PROTOCOL | DIRECTORY-BASED PROTOCOL |
|---|---|---|---|---|
| 1 | LATENCY WHEN LOCAL NODE CACHE IS HIT | ○ CAN RETURN DATA WITHOUT AWAITING SNOOP RESPONSE (MEMORY LATENCY ONLY). | × NEEDS TO AWAIT SNOOP RESPONSE. | ○ CAN RETURN DATA WITHOUT ISSUING SNOOP (MEMORY LATENCY ONLY). |
| 2 | TRAFFIC WHEN LOCAL NODE CACHE IS HIT | × BROADCASTS SNOOP. | × BROADCASTS SNOOP. | ○ ISSUES NO SNOOP. |
| 3 | LATENCY WHEN REMOTE NODE CACHE IS HIT. | ○ DIRECTLY BROADCAST FROM THE REQUESTING NODE. | ○ DIRECTLY BROADCAST FROM THE REQUESTING NODE. | × TIME CONSUMING BECAUSE OF TRANSMISSION IN THE ORDER OF REQUESTING NODE, HOME, AND SNOOP. |

CACHE COHERENCY CONTROL METHOD, CHIPSET, AND MULTI-PROCESSOR SYSTEM

CLAIM OF PRIORITY

The present application claims priority from Japanese patent application JP 2006-000028 filed on Jan. 4, 2006, the content of which is hereby incorporated by reference into this application.

FIELD OF THE INVENTION

The present invention relates to a multi-processor system, a chipset, and a cache coherency control method and more particularly to a technology for shortening the memory access latency.

BACKGROUND OF THE INVENTION

In recent years, computer capabilities have improved and requirements for computers are accordingly increasing. Such tendency leads to widespread use of a multi-processor system mounted with multiple processors especially in the field of servers. When all CPUs are connected to the same memory unit or processor bus, a memory interface or the processor bus bottlenecks to prevent the performance from improving. For a middle to large scale multi-processor system that uses more than four CPUs, it is a frequent practice to arrange multiple nodes, each equipped with two to four CPUs, and distribute load to improve performance. At this time, all memory units are arranged so as to be equally distanced from each CPU. This construction is called a UMA (Uniform Memory Access). According to another construction, a memory unit is mounted on each of nodes. Such construction often causes a difference between the time to access memory in one node and the time to access memory in a remote node. This construction is called an NUMA (Non-Uniform Memory Access). When the hardware provides cache coherency control over each processor, such NUMA is especially called a ccNUMA (Cache Coherent Non-Uniform Memory Access). The UMA is described in detail on page 61 of Implementing mission-critical Linux using ES7000: Unisys Technology Review, No. 84, February 2005, pp. 55-69. The ccNUMA is described in detail in (hppt://phase.phase/o2k/technical-_doc_library/, Origin ccNUMA —True scalability (http://www.sel.kyoto-u.ac.jp/sel/appli/appli-manual/origin -workshop/docs/tec-docs/isca.pdf). Conventionally, it has been reported that ccNUMA can more hardly demonstrate the performance than UMA because the ccNUMA causes a large access difference between the local memory and the remote memory. In recent years, however, the cache capacities have been improved (to decrease memory accesses) and fast system connection networks have been developed to reduce a difference between an access difference between the local memory and the remote memory. In consideration for ccNUMA, an OS or an application is designed to allocate frequently used data to the local memory. According to these resources, it has become possible to easily demonstrate the performance of ccNUMA.

On the other hand, the multi-processor system composed of multiple nodes is subject to a serious problem of cache coherency control between processors. Typical cache coherency control protocols include a broadcast-based snoop protocol and a directory-based protocol. The broadcast-based snoop protocol uses broadcasting to provide pseudo-snoop that is usually performed through a bus. A requesting node broadcasts a snoop request to all nodes. The requested nodes respond with notification whether or not to cache data. Even when no node caches data, the snoop request is always broadcast. There is a possibility of causing unnecessary traffic. When the most recent data is cached, a response directly returns to the requesting node. By contrast, the directory-based protocol manages which node caches data in a directory corresponding to the home node at the requested address. The directory-based protocol performs a snoop according to the directory information. The directory-based protocol is efficient because it supplies no snoop when no node caches data. When the remote node caches data, however, a snoop request is issued in the order of the requesting node, the home node, and the caching node. This extends the latency until the response returns. In short, the broadcast-based snoop protocol may cause unnecessary traffic because a snoop request is always broadcast, but a fast response is available when the remote node caches data. By contrast, the directory-based protocol enables efficient traffic because a snoop request is issued to only an appropriate node, but a response delays when the remote node caches data.

An improved version of the broadcast-based snoop protocol may be available by using a cache copy tag to provide a snoop filter. This is described in JP-A No. 222423/1998, for example. The cache copy tag manages only address tags of all lines and a cache state of the processor cache corresponding to the node. (When used for a directory, the cache copy tag needs to maintain all addresses that are supposed to be cached by all processors in all nodes including that node.) When new data is supplied from the memory according to a request from the processor, data is always registered to the cache copy tag of the requesting node and is returned to the processor. When a node receives a broadcast snoop request from a remote node, that node first searches for a cache copy tag to determine whether or not a relevant line is registered. When a searched-for line is not found or the cache state is invalid (I), the processor does not cache the line. The node can respond without needing to issue a snoop request to the processor bus. When a searched-for line is found and the cache state shows the need for snooping, the node issues a snoop request to the processor bus. After the cache is disabled, the node returns a snoop response. The use of the cache copy tag can provide two effects, i.e., eliminating the traffic on the processor bus and shortening the time for snoop response.

SUMMARY OF THE INVENTION

Let us consider the time for memory access (latency) when a ccNUMA-based SMP machine uses the broadcast-based snoop protocol. Generally, the memory read time is longer than a snoop process. In the ccNUMA construction, The process for a remote node takes more time than the process for a local node. In many cases, a memory access requires the process time whose length can be ranked in either of the following two orders from the shortest to the longest.

(1) Local snoop<local memory data<remote snoop<remote memory data (2) Local snoop<remote snoop<local memory data<remote memory data Which of the local memory data or the remote snoop is faster depends on the connection between nodes or the memory scheme.

Of the above-mentioned two cases, let us consider the case of using the broadcast-based snoop protocol for memory access. It is assumed that no data is cached in a remote node. When the memory node is remote, the remote memory data bottlenecks in either of cases (1) and (2). When the memory node is local, the remote snoop bottlenecks in case (1) or the local memory data bottlenecks in case (2). The time for case (2) cannot be shortened any more because the local memory data bottlenecks. Even when the directory-based protocol is used, the equivalent time is needed. In case (1), however, local memory data already returns but no remote snoop returns, causing the wait time. The directory-based protocol, when used, returns data at the time point the data returns from the memory. Obviously, case (1) takes longer time than the directory-based protocol.

It is therefore an object of the present invention to improve the latency during access to a local node similarly to the directory-based protocol without worsening the memory access latency in the worst case (a case of caching data in a remote node).

The related broadcast-based snoop protocol uses a cache copy tag only for a snoop request broadcast from a remote node. The invention retrieves a local node's cache copy tag when a snoop request broadcast from the local node is sequenced. An advanced response notification is issued to a snoop response result count unit when a relevant line is registered to the local node's cache copy tag and (1) a cache state is exclusive (E) or (2) the cache state is shared (S) and read request. When receiving the advanced response notification, the snoop response result count unit can complete a snoop process without awaiting a snoop response from the remote node. That is, when local node memory data is returned, the data can be returned to the processor before the snoop response returns from the remote node.

When data is read from the local memory, a line may be replaced from the local node cache to improve a hit ratio of the local node's cache copy tag. In this case, a change is made to a process to update the cache copy tag. When the memory for the replaced line belongs to the remote node, the cache copy tag reflects the replaced result. That is, the cache state for the line is set to be invalid. When the memory for the replaced line belongs to the local node, the replaced line is not updated. This makes it possible to provide an effect of hitting the cache copy tag and shortening the memory access latency when the local node processor reaccesses the line replaced from the local node cache before the line is accessed from the remote node.

Alternatively, the cache copy tag is provided with a new replace flag. The replace flag is set when the cache is replaced. The line with the replace flag set behaves to be invalid (I) That is, an unnecessary snoop need not be issued to the processor bus. On the other hand, the line behaves to be the original cache state in response to a local node's snoop request. In this manner, when the local node processor reaccesses the line replaced from the local node cache, it is possible to hit the cache copy tag and shorten the memory access latency.

When a local node cache copy tag is hit, the invention makes it possible to respond with data without awaiting a snoop response from a remote node. A ccNUMA system uses memories distributed to respective nodes and often causes a difference between times to access local memory and remote memory. The invention is especially effective for reading data from the local memory. The invention can improve a hit ratio of cache copy tags by using a method for improving a hit ratio of local memory as well.

FIG. 11 provides a table showing comparison among a protocol according to the embodiment, the broadcast-based snoop protocol, and the directory-based protocol. When a local node copy tag is hit correspondingly to data in the local node memory, the broadcast-based snoop protocol needs to await a snoop response and therefore becomes slower than the directory-based protocol. In this case, the invention can return data with a latency equivalent to that of the directory-based protocol. When a remote node caches data in the remote node memory, the directory-based protocol needs to pass the data in the order of a requesting node, the home node, a cache node, and then the requesting node, thus degrading the latency. Also in this case, the invention can ensure a latency equivalent to that of the broadcast-based snoop protocol. In terms of latencies, the invention provides advantages of both the broadcast-based snoop protocol and the directory-based protocol. (Since the invention always broadcasts a snoop, however, the traffic increases compared to the directory-based protocol.)

The effect of the invention can be demonstrated quantitatively. Let us suppose a system that requires 100 ns for a snoop process in the local node, 130 ns for a memory data response in the local node, 160 ns for a snoop process in the remote node, and 190 ns for a memory data response in the remote node. When the invention is not used, the memory access latency for the local node is 160 ns. When the invention is used, the memory access latency for the local node is 130 ns when hit. When data is hit, the invention can improve the memory access latency for the local node by 30 ns, i.e., less than 20%.

BRIEF DESCRIPTION OF THE DRAWINGS

FIG. 4 is a construction diagram showing the construction of an address 700 for a transaction 500;

FIG. 5 is a table showing categories of a cache state 211;

FIG. 6 is a data construction diagram showing the construction of a transaction 500;

FIG. 7 is a table showing categories of a cache miss request 500;

FIG. 8 is a table showing categories of a cache replace notification 510;

FIG. 9 is a table showing categories of a snoop response 530 and a snoop result 630;

FIG. 10 is a table showing categories of a system transaction;

FIG. 11 is a table showing comparison among respective protocols;

DETAILED DESCRIPTION OF THE PREFERRED EMBODIMENTS

Embodiment 1

Overview

Figure 1:
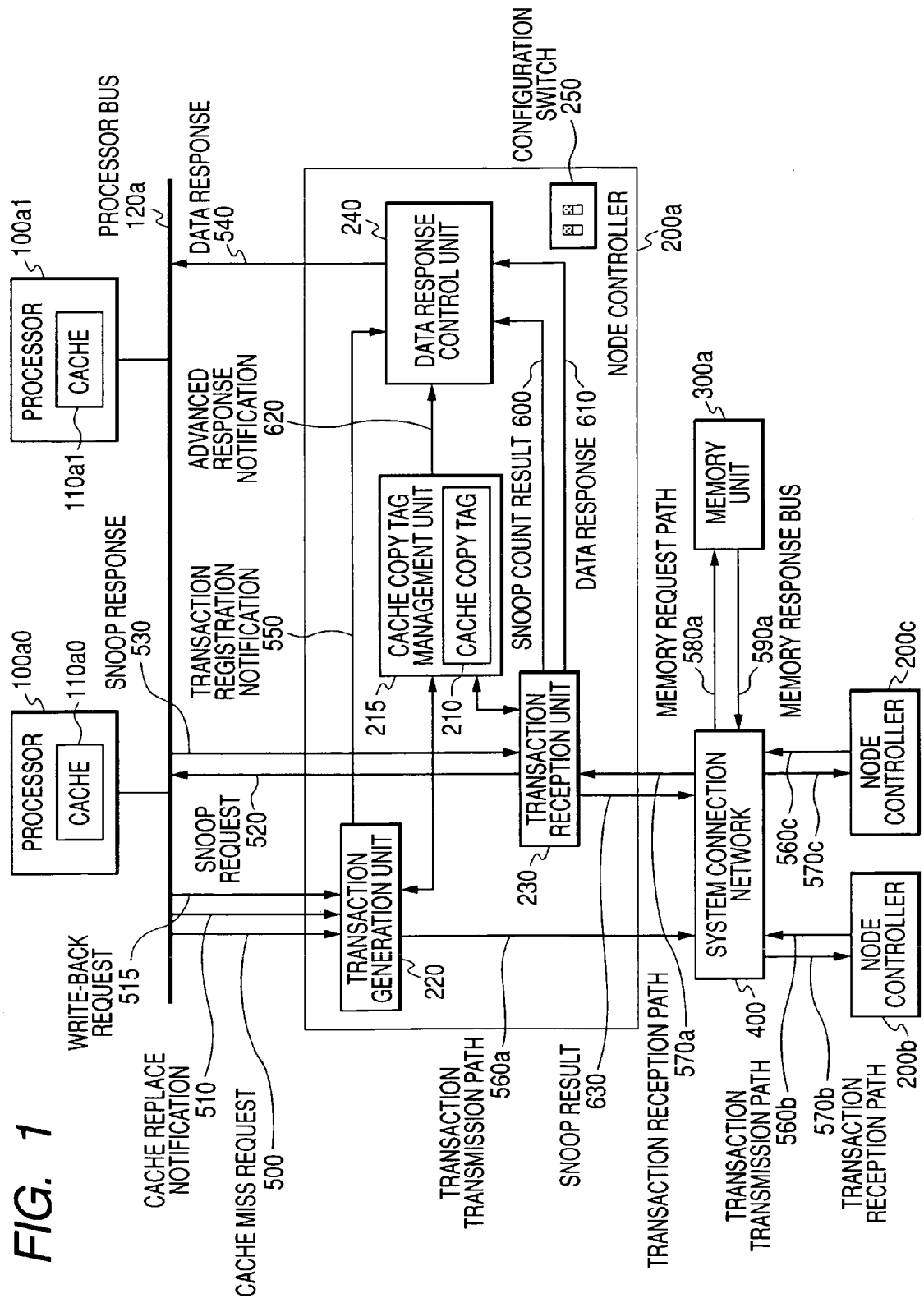
FIG. 1 is a block diagram showing an overall construction of embodiments 1 and 3 according to the invention.

FIG. 1 is a schematic diagram showing a multi-processor system composed of a node controller having a cache coherency control function as embodiment 1 of the invention.

One or more node controllers 200 and memory units 300 are connected to each other via a system connection network 400. The memory unit 300 may be provided in the same node as the node controller 200 or on a system board. That is, a node controller 200*a* and a memory unit 300*a* construct a node. A node controller 200*b* and a memory unit 300*b* construct another node. Though not shown explicitly in FIG. 1, the memory unit 300 is composed of a memory controller and a main storage. Though not shown in FIG. 1, an I/O unit is connected via the node controller 200 or the system connection network 400. Multiple I/O devices are connected to the I/O unit. The node controller 200 connects with one or more processors 100 via the processor bus 120. The processor 100 includes a cache 110. While the embodiment uses one or more processors, each processor may be provided as multi-core construction in which one processor contains two or more processor cores. In the following description, the processor core can substitute for the processor.

The node controller 200 includes a transaction generation unit 220, a transaction reception unit 230, a cache copy tag management unit 215, a data response control unit 240, and a configuration switch 250. The transaction generation unit 220 accepts a transaction issued from the processor bus 120. The transaction reception unit 230 accepts a transaction supplied from the system connection network 400. The cache copy tag management unit 215 manages the cache copy tag 210. The data response control unit 240 counts a snoop result to controls data response.

The transaction generation unit 220 accepts transactions such as a cache miss request 500, a cache replace request 510, and a write-back request 515. As shown in FIG. 7, the cache miss request 500 is available as two types, i.e., read and read invalidate. (While more types are available actually, only these two types are described in this specification.) As shown in FIG. 8, the cache replace request 510 is available as two types, i.e., write-back and clean replace. The clean replace request may not be issued depending on processor settings.

Figure 2:
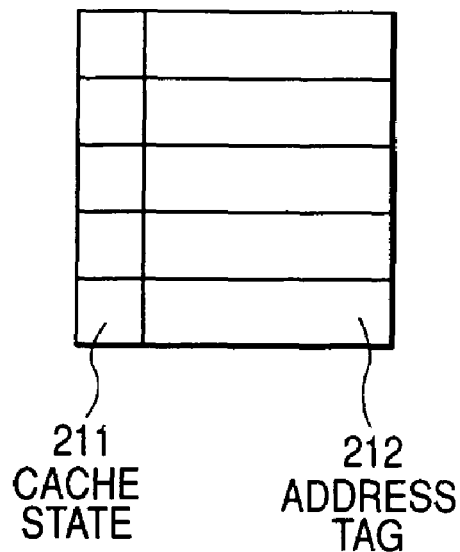
FIG. 2 is a construction diagram of a cache copy tag 210.
Figure 3:
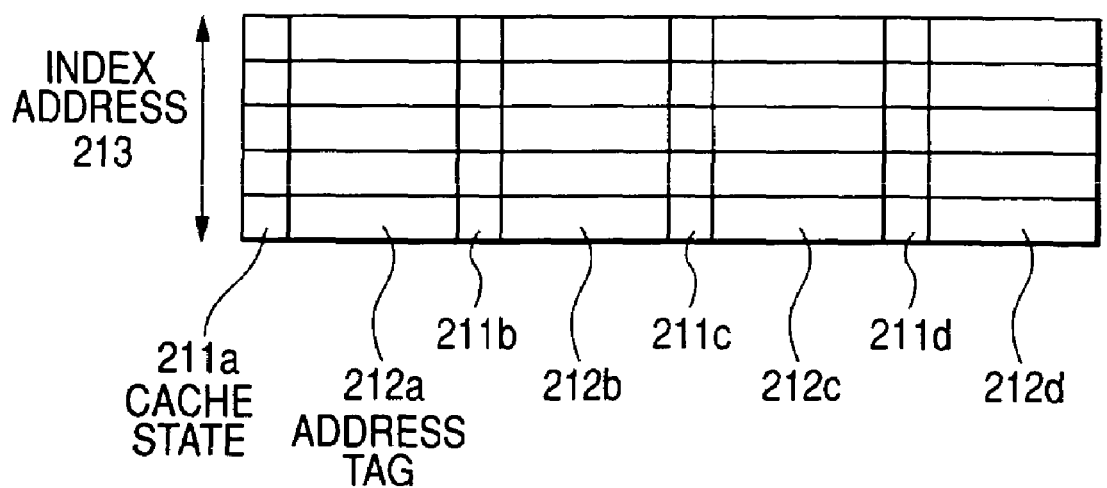
FIG. 3 is a construction diagram when the cache copy tag 210 is 4-way set associative.

FIG. 2 shows the construction of the cache copy tag 210. Each entry of the cache copy tag 210 is composed of a cache state 211 and an address tag 212. The cache copy tag 210 can be variously constructed ranging from a direct map for directly mapping one entry to an addressed index to a fully associative map capable of using any free entries. The embodiment provides an example of 4-way set associative mapping. When a transaction 505 is issued to a processor bus 120, the transaction 505 is assigned a corresponding address 700 as shown in FIG. 6. As shown in FIG. 4, the address 700 is composed of an address tag 701, an index 702, and an offset 703. For the 4-way set associative cache copy tag, one index is associated with four entries as shown in FIG. 3. When the four entries associated with the index 702 include an entry with the address tag 212 matching the address tag 701, the targeted address hits the cache copy tag. The corresponding cache state 211 takes effect for the targeted address.

The cache copy tag 210 is categorized into one of three cache states 211 as shown in FIG. 5. Cache state I (invalid) indicates that the address is not cached in the node. Cache state S (shared) indicates that the address is cached in the node in a clean, shared state. Cache state E (exclusive) indicates that the address is dedicated to the node only and may be rewritten. The general MESI protocol uses state M in addition to I, S, and E. For the cache copy tag, however, the node controller is not notified of whether or not the processor rewrites the cache in the E state. Both cache states E and M correspond to cache state E for the cache copy tag.

The processor 100 may issue the cache miss request 500 to the processor bus 120. Alternatively, the node controller 200 may issue a snoop request 520 to the processor bus 120. In these cases, the processor 100 connected to the processor bus 120 returns the snoop response 530. In addition, the transaction generation unit 220 in the node controller 200 may broadcast a snoop request to the other node controllers 200. In this case, each of the node controllers returns a snoop request to the requesting node controller. The snoop response 530 and the snoop result 630 are defined to be three types as shown in FIG. 9. OK indicates that no cache is provided (or once provided but now discarded). HIT indicates that the cache is maintained in the shared state (S). HITM indicates that the most recent cache is maintained. When the snoop response 530 is HITM, the snoop response 530 is followed by the write-back request 515.

FIG. 10 shows part of system transactions the transaction generation unit 220 issues, or the transaction reception unit 230 issues or receives. A snoop request is broadcast from the requesting node controller 200 to all the node controllers 200. A snoop result is returned from all the broadcast node controllers 200 to the requesting node controller 200. A memory read request is issued from the requesting node controller 200 to the memory unit 300 in the node provided with the corresponding address. A memory write request is issued from the node controller 200 to the memory unit 300 in the node provided with the corresponding address when the cache replace notification is issued or when the snoop result is HITM. A data response is returned to the requesting node controller 200 from the memory unit 300 as a result of the memory read request or from the node controller 200 as a result of inter-cache transfer after the snoop.

Operations after Generation of the Cache Miss Request

Referring mainly to FIG. 1, the following describes operations after generation of the cache miss request according to embodiment 1.

Operations of the requesting node will be described first. When a processor 100*a*0 accesses a line not found in a cache 110*a*0, the cache miss request 500 is issued via a processor bus 120*a*. The transaction generation unit 220 receives the cache miss request 500 and notifies the data response control unit 240 of an originator identifier 720 and the like as transaction registration notification 550. The transaction generation unit 220 specifies a node corresponding to the destination memory according to the address 700 contained in the transaction. The transaction generation unit 220 issues a memory read request to the memory unit 300 in that node via a transaction transmission path 560*a*.

The snoop response 530 to the cache miss request 500 is notified to the transaction reception unit 230. When the processor 100*a*1 holds the most recent data as a result of the snoop, the inter-cache transfer completes the cache miss request on the processor bus 120a. When no inter-cache transfer occurs, the transaction generation unit 220 issues a snoop request to the node controllers 200 in all nodes.

The transaction generation unit 220 then requests the cache copy tag management unit 215 to retrieve a local node cache copy tag. The cache copy tag management unit 215 checks whether or not the corresponding address is registered to the cache copy tag 210. When the corresponding address is registered and the cache state 211 is marked E (exclusive), the cache copy tag management unit 215 notifies the data response control unit 240 of an advanced response notification 620. When the cache state 211 is marked S (shared) and the cache miss request 500 is read, the cache copy tag management unit 215 also notifies the data response control unit 240 of an advanced response notification 620. When the address is not registered to the cache copy tag 210, the cache copy tag management unit 215 ensures a new entry and initializes the cache state to I (invalid).

The following describes operations of the node that receives a broadcast snoop request. When receiving the snoop request via a transaction reception path 570, the transaction reception unit 230 requests the cache copy tag management unit 215 to retrieve the cache copy tag 210. In a case, the snoop-requested address may be not registered to the cache copy tag 210. In another case, the address may be registered and the cache state 211 is I (invalid). In still another case, the address may be registered, the cache state 211 is S (shared), and the snoop request is read. In any of these cases, the cache copy tag management unit 215 responds that the address does not hit. The cache state 211 may be E (exclusive). Alternatively, the cache state 211 may be S (shared), and the snoop request may be read invalidate. In any of these cases, the cache copy tag management unit 215 responds that the address hits.

When the address does not hit as a result of the cache copy tag retrieval, the transaction reception unit 230 issues the snoop result 630 to the requesting node. When the address is not registered or the cache state is I (invalid), the transaction reception unit 230 responds with OK. When the cache state is S (shared) and the snoop request is read, the transaction reception unit 230 responds with HIT.

When the address hits as a result of the cache copy tag retrieval, the transaction reception unit 230 issues the snoop request 520 to the processor bus 120 and receives the snoop response 530. When the snoop response 530 is HITM, the transaction reception unit 230 needs to perform an inter-cache transfer to return the most recent data to the requesting node. When receiving the most recent data by means of the write-back request 515, the transaction generation unit 220 issues the most recent data as a data response to the requesting node. The transaction generation unit 220 updates the cache state 211 of the cache copy tag 210 to I (invalid). The transaction reception unit 230 issues HITM as the snoop result 630 to the requesting node.

When the snoop response 530 is not HITM, the transaction generation unit 220 directly issues the snoop response 530 as the snoop result 630 to the requesting node. The cache state 211 of the cache copy tag 210 changes to S (shared) when the snoop response 530 is HIT, and changes to I (invalid) otherwise.

Figure 22:
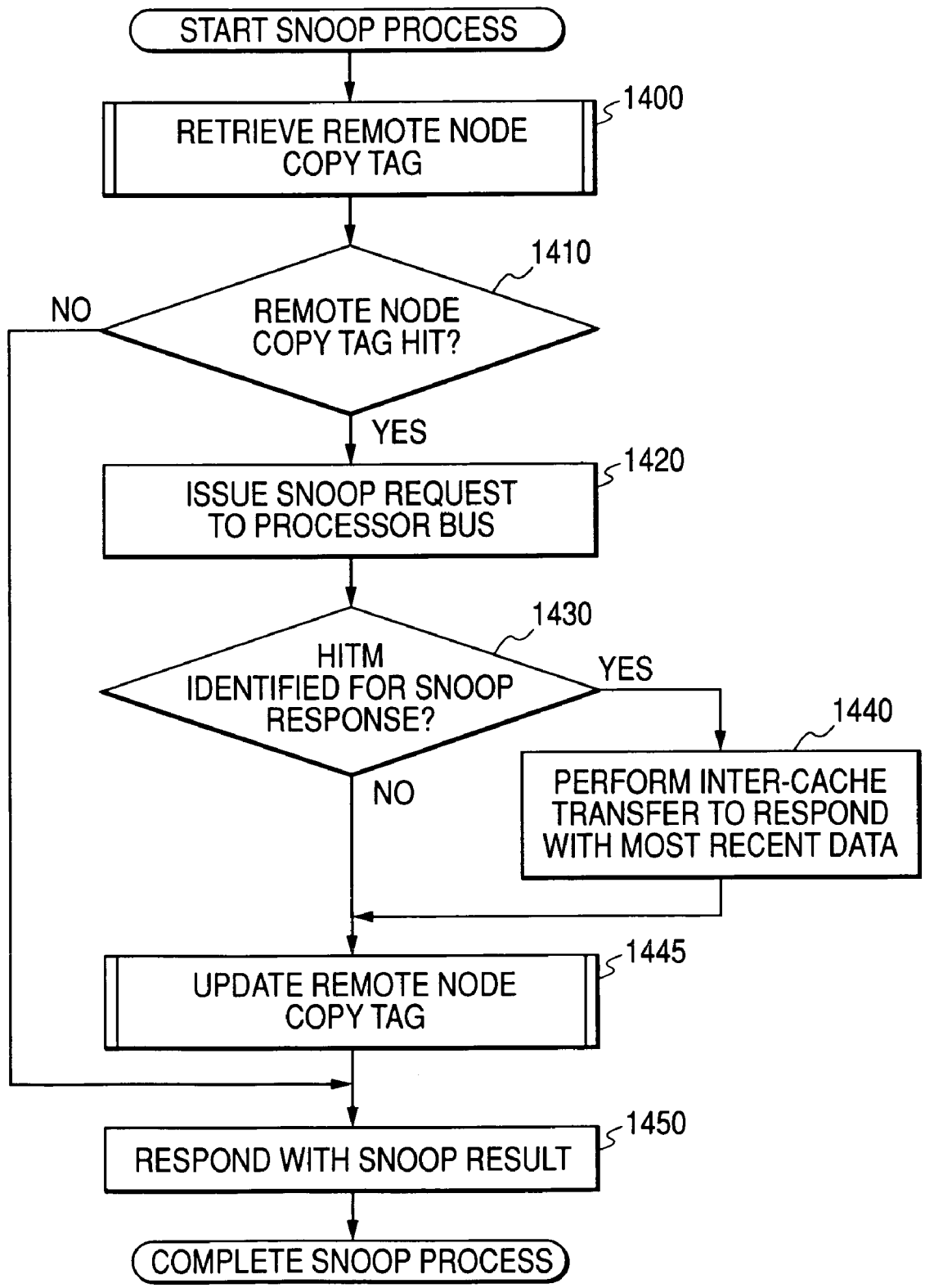
FIG. 22 is a basic flowchart of a remote node snoop process according to embodiment 1.
Figure 23:
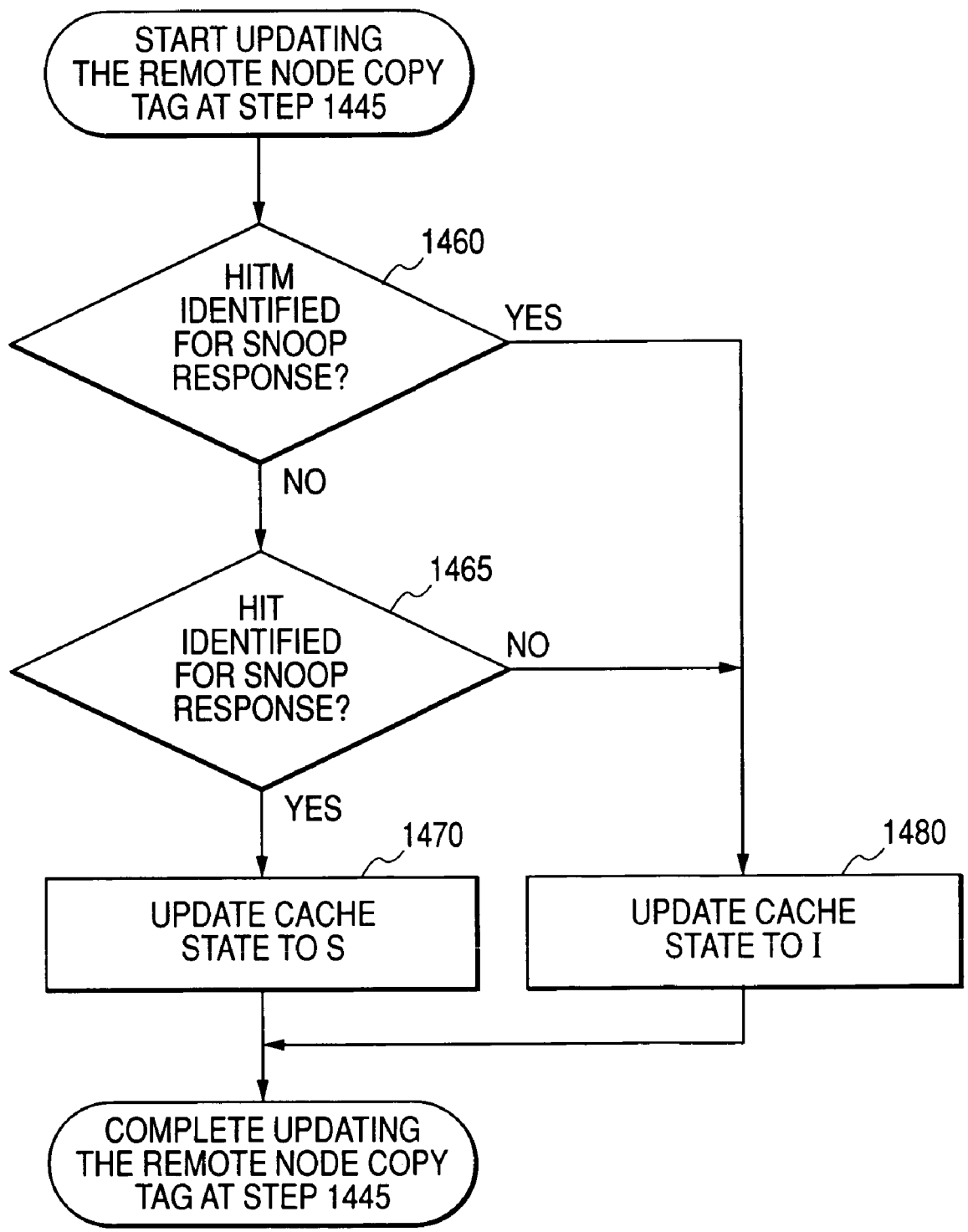
FIG. 23 is a detailed flowchart for "update remote node copy tag" at Step 1445.

FIGS. 22 and 23 are flowcharts showing operations of the node that received the snoop request as mentioned above. The following describes the operations of the node with reference to FIGS. 22 and 23.

FIG. 22 is a basic flowchart of a remote node snoop process. The remote node snoop process starts when the transaction reception unit 230 receives a snoop request via the transaction reception path 570. At Step 1400, the process searches for a remote node copy tag. To be more specific, Step 1400 contains Steps 1500 to 1580 in FIG. 24 according to the embodiment. The details are not described here. At Step 1410, the process determines whether or not the search for a remote node copy tag is hit. When the result is successful, the process proceeds to Step 1420. When the result is unsuccessful, the process proceeds to Step 1450. At Step 1420, the process issues the snoop request 520 to the processor bus 120. After issuing the snoop request, the process receives the snoop response 530 and proceeds to Step 1430. At Step 1430, the process determines whether or not the result of the snoop response 530 is HITM. When the snoop response 530 is HITM, i.e., the most recent data is cached, the process proceeds to Step 1440 and then to Step 1445. When the snoop response 530 is not HITM, the process directly proceeds to Step 1445. At Step 1440, an inter-cache transfer is performed to respond with the most recent data. The process receives the write-back request 515 resulting from the snoop and issues it as inter-cache transfer data to the requesting node. Step 1445 is used to update the remote node copy tag. The details will be described with reference to FIG. 23.

Step 1450 is used to respond with the snoop result. The process responds with HITM when the inter-cache transfer occurs. The process responds with HIT when the snoop response results in HIT or the cache state is changed to S. The process responds with OK when the snoop response results in OK or the search for the remote node copy tag is not hit. The snoop process is complete.

FIG. 23 shows Step 1445 for updating the remote node copy tag. At Step 1460, the process determines whether or not the snoop result is HITM. When the snoop result is HITM, the process proceeds to Step 1480. Otherwise, the process proceeds to Step 1465. At Step 1465, the process determines whether or not the snoop result is HIT. When the snoop result is HIT, the process proceeds to Step 1470. Otherwise, the process proceeds to Step 1480. At Step 1470, the process changes the copy tag's cache state to S (shared). At Step 1480, the process changes the copy tag's cache state to I (invalid). In this manner, Step 1445 for updating the remote node copy tag is complete.

The following describes operations of the memory unit 300. When receiving a memory read request via a memory request path 580, the memory unit 300 reads the contents of memory assigned with the corresponding address and issues a data response to the requesting node via a memory response bus 590. When receiving a memory write request via a memory request path 580, the memory unit 300 writes data accompanying the memory write request to memory assigned with the corresponding address. Upon completion of the memory write, the memory unit 300 can return ACK to the requesting node. The operations of the memory unit 300 have been described.

Again, the following describes operations of the requesting node. The transaction reception unit 230 is supplied with: the snoop result 630 corresponding to the broadcast snoop request; the data response corresponding to the memory read request issued to the memory unit; or the data response as a result of the inter-cache transfer if occurred. When collecting all the snoop results 630 corresponding to the issued snoop requests, the transaction reception unit 230 notifies a snoop count result 600 to the data response control unit 240. The snoop count result 600 is determined as follows. When the snoop results 630 contain at least one HITM, the transaction reception unit 230 also assumes the snoop count result to be HITM. When the snoop results 630 contain at least one HIT, or when the local node causes the snoop response 530 to be HIT, the transaction reception unit 230 also assumes the snoop count result to be HIT. Otherwise, the transaction reception unit 230 assumes the snoop count result 600 to be OK.

The transaction reception unit 230 receives a data response from the memory or as a result of the inter-cache transfer and then notifies a data response 610 to the data response control unit 240. The data response control unit 240 waits until the snoop count result 600 or the advanced response notification 620 and the data response 610 are supplied. When the snoop count result 600 is HITM, the data response control unit 240 awaits a data response from the inter-cache transfer, not from the memory. When the snoop count result 600 or the advanced response notification 620 and the data response 610 are supplied, the data response control unit 240 returns a data response 540 to the requesting processor 100a0 via the processor bus 120a.

Lastly, the cache copy tag management unit 215 updates the cache state 211 of the cache copy tag 210 having the corresponding address. When the cache miss request is read invalidate or the snoop count result 600 is HITM or OK, the cache copy tag management unit 215 updates the cache state to E (exclusive). When the cache miss request is read and the snoop count result 600 is HIT, the cache copy tag management unit 215 updates the cache state to S (shared). In this manner, the cache miss request operations are complete.

Figure 15:
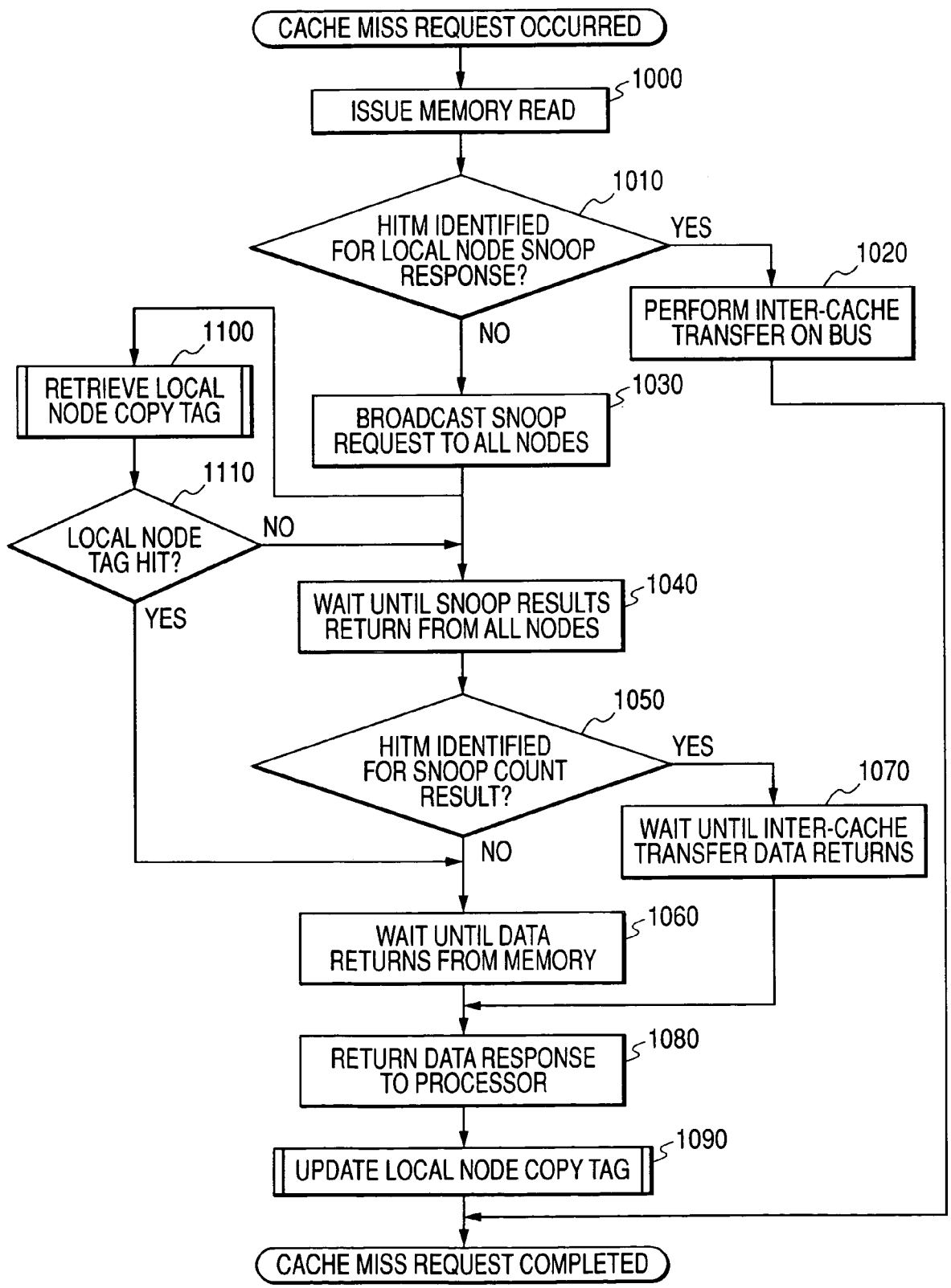
FIG. 15 is a basic flowchart of a cache miss request in embodiment 1.
Figure 16:
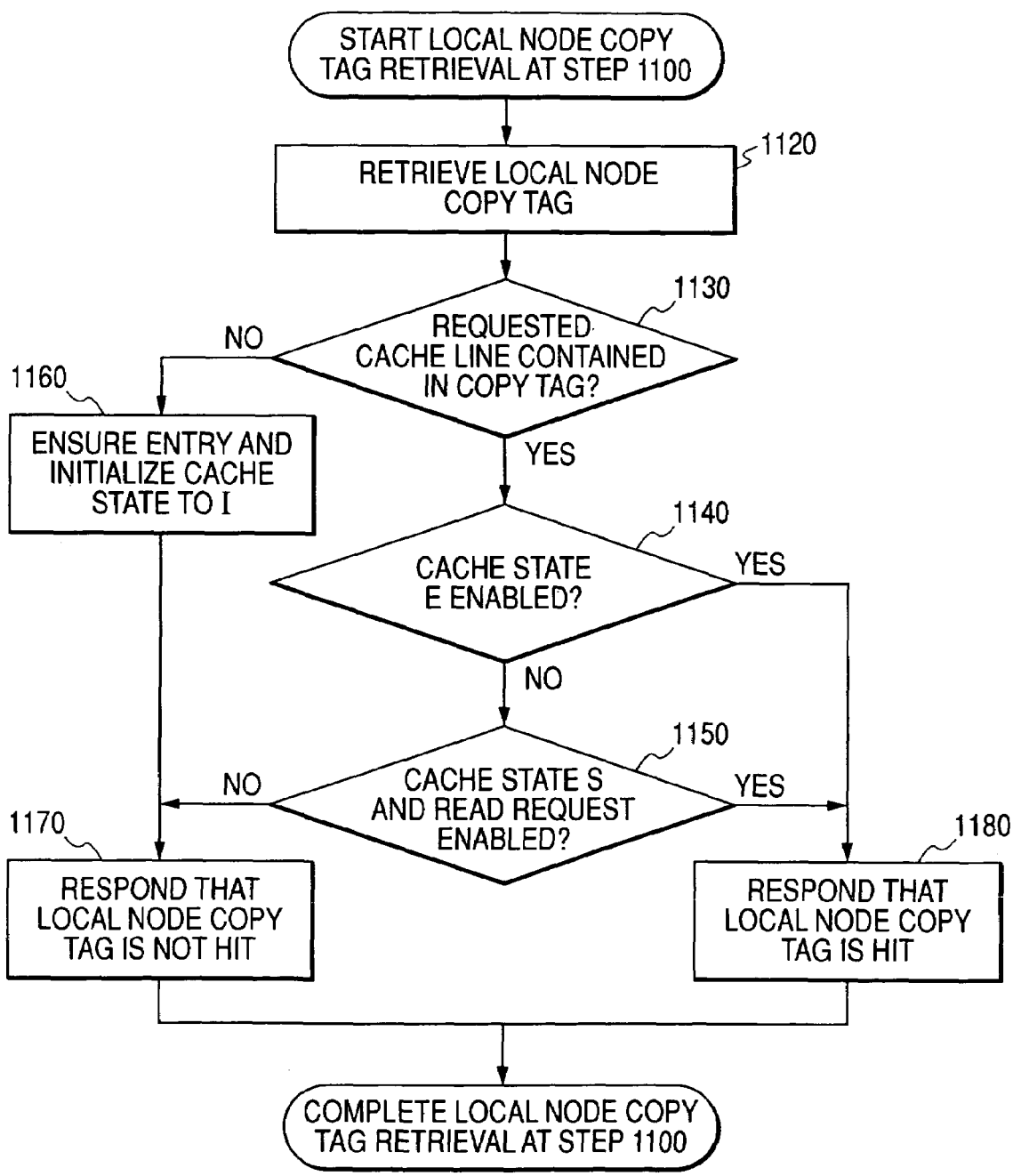
FIG. 16 is a detailed flowchart for "retrieve local node copy tag" at Step 1100.
Figure 17:
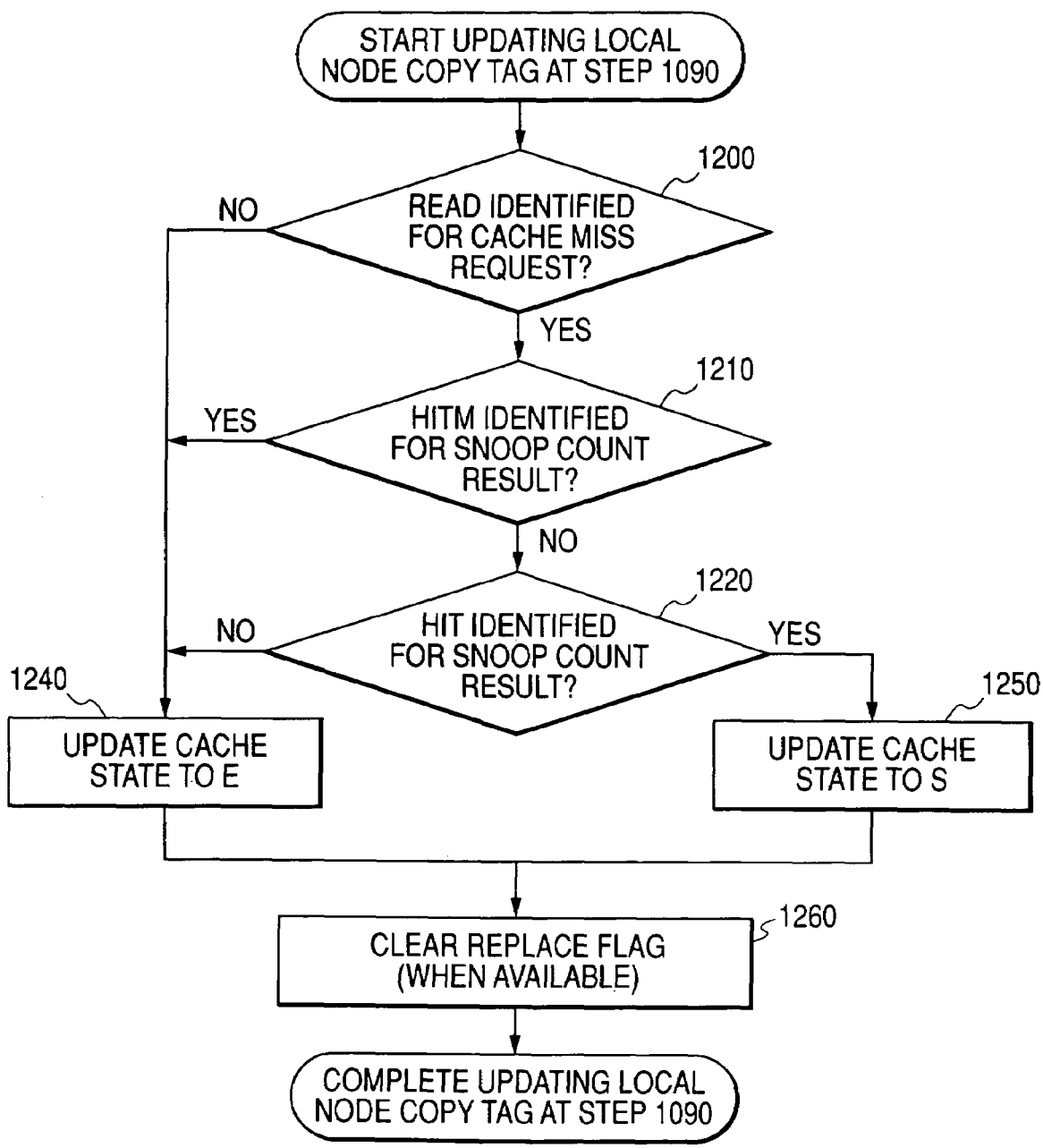
FIG. 17 is a detailed flowchart for "update local node copy tag" at Step 1090.

FIG. 15 is a flowchart showing the cache miss request according to embodiment 1. FIG. 16 is a detailed flowchart for Step 1100 in FIG. 15. FIG. 17 is a detailed flowchart for Step 1090 in FIG. 15. Again, the following describes the cache miss request according to embodiment 1 with reference to these flowcharts.

A sequence of cache miss request operations in FIG. 15 starts when the cache miss request 500 arrives from the processor 100a0 via the processor bus 120. At Step 1000, the transaction generation unit 220 of the node controller 200 issues a memory read to the memory unit 300 of an appropriate node in accordance with the address in the cache miss request 500. At Step 1010, the process receives the snoop response 530 from another processor 100 on the local node's processor bus 120 and determines whether or not the snoop response 530 is HITM. When the snoop response 530 is HITM, i.e., when the inter-cache transfer occurs on the local node, the process proceeds to Step 1020. When the snoop response 530 is not HITM, the process proceeds to Step 1030. At Step 1020, the process is performed when the inter-cache transfer occurs on the local node. That is, the process returns data to the requesting processor via the processor bus 120. In this case, the cache miss request is completed. At Step 1030, the process broadcasts the snoop request to all nodes. That is, the process broadcasts the snoop request to all nodes via the transaction transmission path 560. At Step 1100, the process retrieves a copy tag for the local node. The detail of the process at Step 1100 is shown in FIG. 16 and will be described in detail later. At Step 1110, the process determines whether or not the local node tag is hit as a result of retrieving the copy tag for the local node at Step 1100. When the local node tag is hit, the process proceeds to Step 1060. When the local node tag is not hit, the process proceeds to Step 1040.

At Step 1040, the process waits until the snoop result 630 returns in response to the snoop request broadcast to all nodes. The transaction reception unit 230 receives the snoop result via the transaction reception path 570. When collecting all snoop results, the transaction reception unit 230 notifies the snoop count result 600 to the data response control unit 240.

At Step 1050, the process receives the snoop count result 600 and determines whether or not the snoop result is HITM. When at least one snoop result is HITM, i.e., at least one node maintains the most recent data, the memory does not contain the most recent data. In this case, the process proceeds to Step 1070. When no snoop result is HITM, the memory contains the most recent data. In this case, the process proceeds to Step 1060.

At Step 1060, the process awaits data returned from the memory. The data response control unit 240 receives the memory data response 610 and proceeds to Step 1080. At Step 1070, the process awaits inter-cache transfer data. The data response control unit receives the inter-cache transfer data and proceeds to Step 1080.

At Step 1080, the process returns the data response 540 to the requesting processor 100a0. At Step 1090, the process updates the local node's copy tag. The detail of this update is shown in FIG. 17 and will be described later. In this manner, the cache miss request is complete.

FIG. 16 shows a detailed flowchart of the process at Step 1100 for retrieving the local node's copy tag. At Step 1120, the process retrieves the local node's copy tag. At Step 1130, the process determines whether or not the copy tag contains a requested cache line. When the copy tag does not contain the requested cache line, the process proceeds to Step 1160. When the copy tag contains the requested cache line, the process proceeds to Step 1140.

At Step 1160, the process ensures an entry and initializes the cache state to I (invalid). When entries corresponding to the relevant index are all used, the process needs to select any one of the entries and issue the snoop request 520 to the processor bus 120 to disable the cache. However, the detailed description is omitted here. Upon completion, the process proceeds to Step 1170.

At Step 1140, the process determines whether or not the cache state in the copy tag is E (exclusive). When the cache state is E (exclusive), the process proceeds to Step 1180. Otherwise, the process proceeds to Step 1150. At Step 1150, the process determines whether or not the cache state in the copy tag is S (shared) and a read request is issued. When the cache state is S (shared) and the read request is issued, the process proceeds to Step 1180. Otherwise, i.e., when the cache state is I (invalid) or a read invalidate request is issued, the process proceeds to Step 1170.

At Step 1170, the process responds that the local node copy tag is not hit. In this manner, the retrieval for the local node copy tag is complete.

At Step 1180, the process responds that the local node copy tag is hit. In this manner, the retrieval for the local node copy tag is complete.

The following describes in detail the process at Step 1090 for updating the local node copy tag with reference to FIG. 17. At Step 1200, the process determines whether or not the cache miss request is read. When the cache miss request is read, the process proceeds to Step 1210. When the cache miss request is not read, i.e., read invalidate, the process proceeds to Step 1240.

At Step 1210, the process determines whether or not the snoop count result is HITM. When at least one snoop result is HITM, the process proceeds to Step 1240. When no snoop result is HITM, the process proceeds to Step 1220. At Step 1220, the process determines whether or not the snoop count result is HIT. When at least one snoop result is HIT, or when the local node snoop response is HIT, the process proceeds to Step 1250. Otherwise, the process proceeds to Step 1240. At Step 1240, the process updates the cache state to E (exclusive). Upon completion, the process proceeds to Step 1260. At Step 1250, the process updates the cache state to S (shared). Upon completion, the process proceeds to Step 1260. At Step 1260, the process clears the replace flag, if any, in an entry of the cache copy tag. When no replace flag is found, the process does nothing. In this manner, the process to update the local node copy tag is complete.

Operations of the Cache Replacement Process

The following describes operations of the cache replacement process according to embodiment 1.

When the cache 110a0 of the processor 100a0 is full of lines, an old line is eliminated. This is called cache replacement. The cache replacement is notified as the cache replace notification 510 to the transaction generation unit 220 of the node controller 200a via the processor bus 120a. As shown in FIG. 8, there are two types of the cache replace notification 510. When the cache replace notification 510 is write-back, the processor bus 120a issues the most recent data accompanying the write-back request. The transaction generation unit 220 notifies the cache replacement to the cache copy tag management unit 215. The cache copy tag management unit 215 updates the cache state of the relevant entry in the cache copy tag 210 to I (invalid). When the cache replace notification is write-back, the transaction generation unit 220 specifies a node corresponding to the address and issues a memory write request aimed at the memory unit 300 in that node. In this manner, the cache replacement process is complete.

Figure 18:
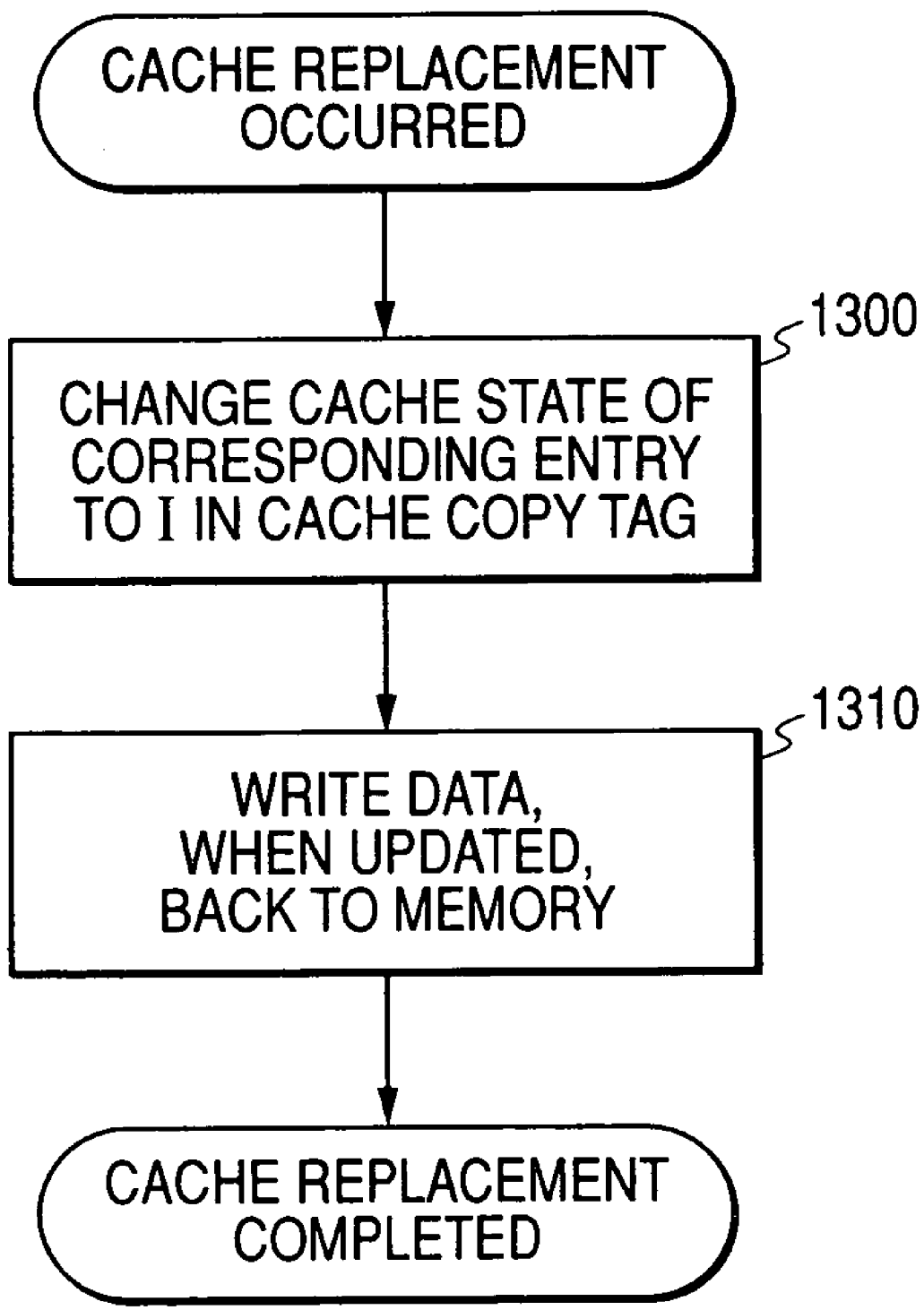
FIG. 18 is a basic flowchart

FIG. 18 is a flowchart showing a typical example of the above-mentioned cache replacement process. The following again describes the cache replacement process with reference to this flowchart.

The cache replacement process in FIG. 18 starts when the cache replace notification 510 arrives from the processor 100a0 via the processor bus 120. At Step 1300, the process retrieves the cache copy tag 210 and updates the cache state of a corresponding entry (surely available) to I (invalid). At Step 1310, the process writes data back to the memory when the data is updated as a result of the cache replacement. When the data is updated, a write-back transaction is issued via the transaction transmission path 560 to the memory unit 300 of the node corresponding to the cache line address. In this manner, the cache replacement is complete. The above-mentioned sequence of operations implements the broadcast-based snoop protocol that shortens the latency when the local node copy tag is hit.

Modification 1 of Embodiment 1

The cache miss request according to modification 1 operates similarly to embodiment 1. On the other hand, the cache replacement process according to modification 1 operates slightly differently from embodiment 1. That is, the cache copy tag management unit 215 is notified of the cache replacement from the transaction generation unit 220. At this time, the cache copy tag management unit 215 is also notified of a node that includes memory having an address targeted for the cache replacement. When the targeted address points to a remote node, the process updates the cache copy tag similarly to embodiment 1 as mentioned above. When the targeted address points to the local node, the process does not update the cache copy tag. Modification 1 of embodiment 1 has now been described.

Figure 19:
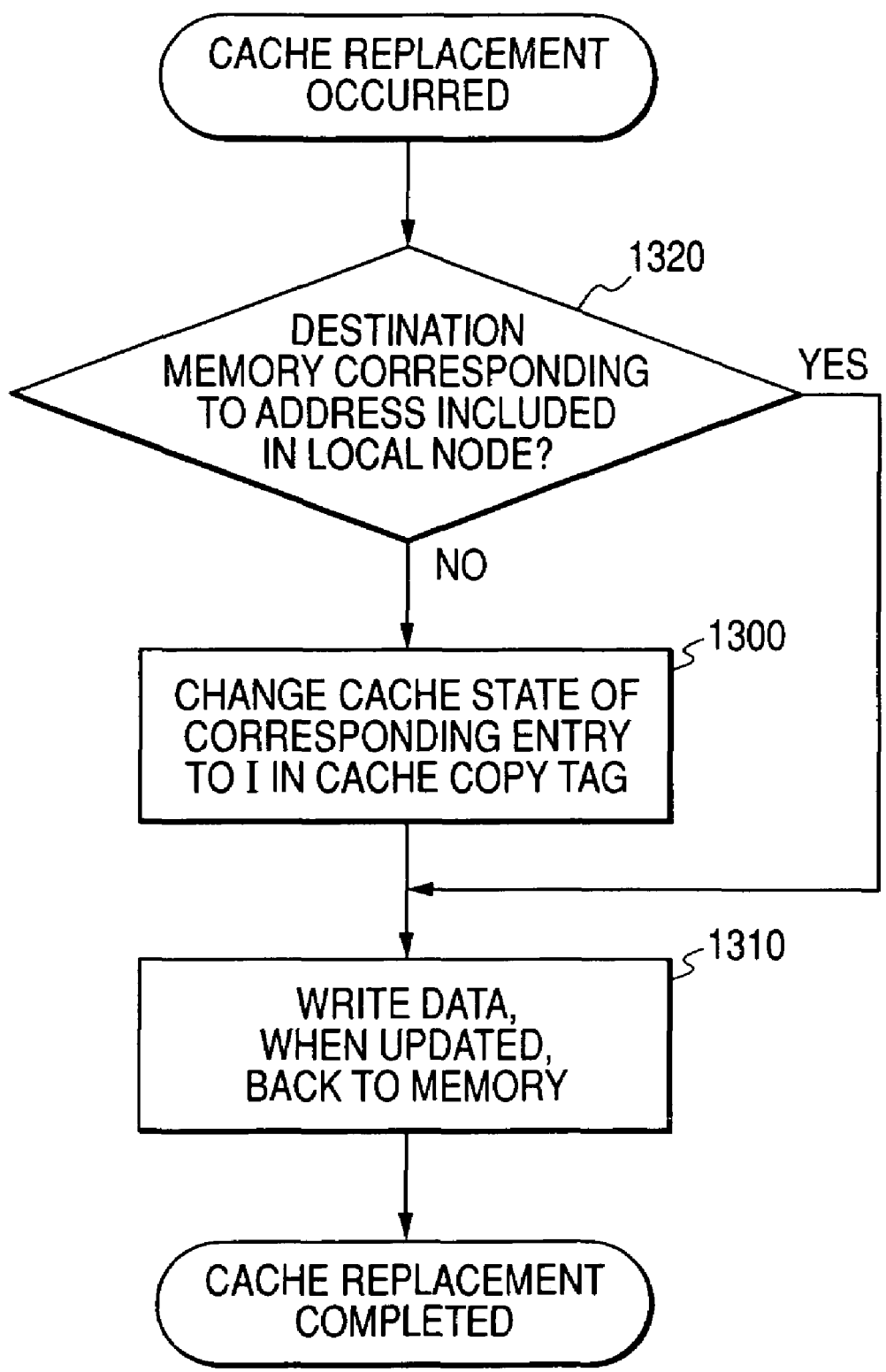
FIG. 19 is a flowchart showing a cache replacement process according to modification 1 of embodiment 1.

FIG. 19 shows a flowchart of the cache replacement process according to modification 1. This flowchart can replace the flowchart in FIG. 18. When a cache replacement request occurs, the process determines at Step 1320 whether or not the local node contains destination memory corresponding to the address for the relevant cache line. When a remote node contains the destination memory, the process proceeds to Step 1300. The subsequent flow is the same as that for the cache replacement process according to embodiment 3 in FIG. 18. When the local node contains the destination memory, the process proceeds to Step 1310. Accordingly, the step of updating the cache state is skipped.

Modification 1 as mentioned above can improve a ratio of hitting the local node cache copy tag.

Modification 2 of Embodiment 1

The construction of modification 2 is mostly common to that of embodiment 1, i.e., as shown in FIG. 1. According to modification 2, however, the configuration switch 250 of the node controller 200 includes a cache replacement cache replacement cache replacement control switch 270. The cache replacement cache replacement cache replacement control switch 270 enables or disables the replacement.

The cache copy tag management unit 215 is notified of cache replacement from the transaction generation unit 220 and then checks the state of the cache replacement cache replacement control switch 270. When the cache replacement cache replacement control switch 270 enables the replacement, the cache copy tag management unit 215 updates the cache copy tag similarly to the basic example of embodiment 1. When the cache replacement cache replacement control switch 270 disable the replacement, the cache copy tag management unit 215 does not update the cache copy tag.

Figure 20:
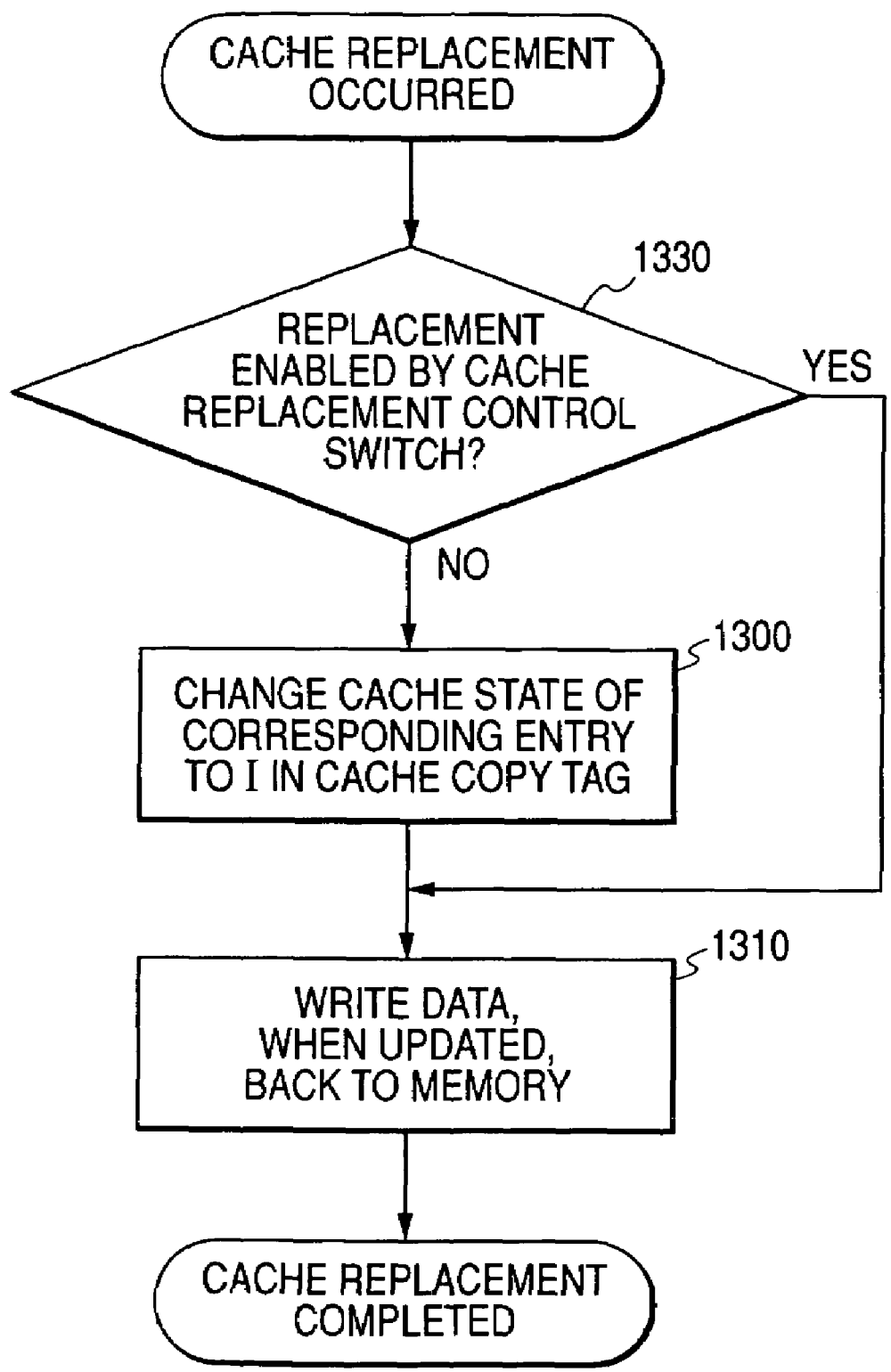
FIG. 20 is a flowchart showing a cache replacement process according to modification 2 of embodiment 1.

FIG. 20 shows a flowchart of the cache replacement process according to modification 2. This flowchart can replace that in FIG. 18.

When the cache replacement process occurs, the process determines at Step 1330 whether or not the cache replacement control switch 270 enables the replacement. When the replacement is enabled, the process proceeds to Step 1330. The subsequent flow is the same as that for the cache replacement process according to embodiment 3 in FIG. 18. When the cache replacement control switch disables the replacement, the process directly proceeds to Step 1310. That is, the process skips the step of updating the cache state to I (invalid).

As mentioned above, modification 2 differs from embodiment 1 in the operation of the cache replacement process. The operation for the cache miss request is completely the same as that for embodiment 1.

Similarly to modification 1, modification 2 can also improve a ratio of hitting the local node cache copy tag.

The cache replacement cache replacement control switch 270 and the other configuration switch 250 need not be physical switches and may be provided electronically or logically or as a program. The cache replacement control switch may disable the replacement when the local node is assumed to highly possibly access the memory (memory configured by OS or firmware in accordance with ccNUMA). Otherwise, the cache replacement control switch may enable the replacement.

Modification 3 of Embodiment 1

Figure 13:
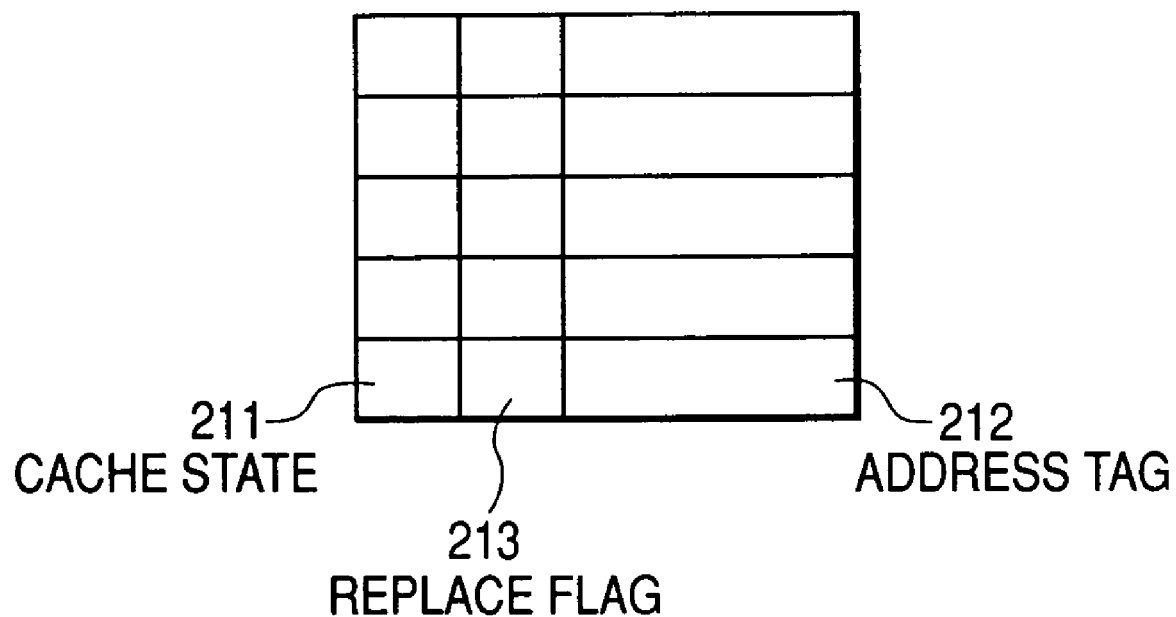
FIG. 13 is a conceptual diagram showing the construction of the cache copy tag 210 modification 3 of embodiment 1 and a modification of embodiment 3.

Modification 3 is constructed almost similarly to embodiment 1 and is shown in FIG. 1. As shown in FIG. 13, the cache copy tag 210 according to modification 3 is provided with a replace flag 213 in addition to the cache state 211 and the address tag 212. The replace flag 213 is cleared when the local node copy tag is updated at the end of the cache miss request.

Modification 3 differs from embodiment 1 as follows when a cache miss request occurs. When the remote node receives a snoop request to retrieve the remote node copy tag, the cache copy tag 210 may contain an entry corresponding to the requested cache line. The operation at this time differs from embodiment 1 above. That is, when the cache copy tag 210 contains an entry corresponding to the requested cache line, the cache copy tag management unit 215 determines whether or not the replace flag 213 is set. When the replace flag 213 is not set, the subsequent process is similar to embodiment 1 above in accordance with the cache state 211 or depending on whether the snoop request is read or read invalidate. When the replace flag 213 is set, the process changes the corresponding cache state 211 to I and clears the replace flag 213. The process responds that no remote node copy tag is hit.

Figure 21:
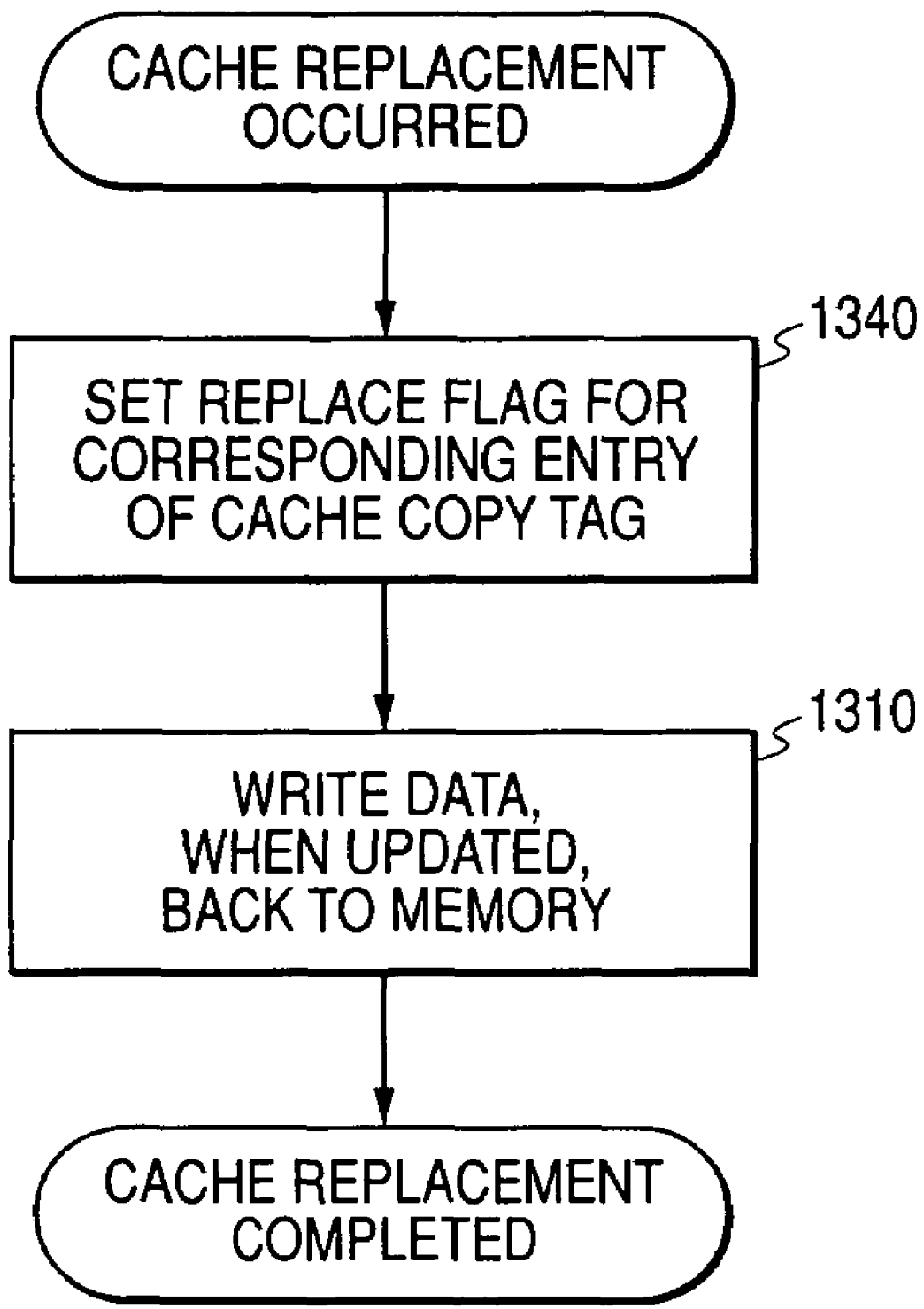
FIG. 21 is a flowchart showing a cache replacement process according to modification 3 of embodiment 1.

The following describes operations of the cache replacement process according to modification 3. The cache copy tag management unit 215 is notified of the cache replacement from the transaction generation unit 220 and then sets the replace flag 213 for the corresponding entry in the cache copy tag 210. The process does not change the cache state 211. That is, the cache replacement process is performed in accordance with the flowchart in FIG. 21 instead of the flowchart in FIG. 18 used for embodiment 1. At Step 1340, the process sets the replace flag 213 for a corresponding entry (surely available) of the cache copy tag. When the data is updated as a result of the cache replacement, the process writes the data back to the memory at Step 1310.

According to the above-mentioned sequence of operations, the local node copy tag retrieval hits the entry for the cache replacement occurrence. The remote node copy tag retrieval does not hit the entry. In this manner, the latency can be shortened when the local node first reissues the cache miss request. Further, a snoop result can be responded without snooping the processor bus when the remote node first issues a snoop request.

In stead of providing the replace flag 213, another method may be possible to enhance the cache state 211 and add states such as E' and S'. When the line in cache state E is replaced, the cache state may be set to E'. When the local node accesses again, the cache state may be returned to E. Since this enhancement is equivalent to provision of the replace flag, a description is omitted.

Embodiment 2

Embodiment 2 of the invention will be described with reference to FIG. 14 and FIGS. 1 through 13. Reference symbols in FIG. 14 correspond to the elements described with reference to FIGS. 1 through 13.

Embodiment 2 provides a ccNUMA-based multi-processor system composed of multiple nodes. Each node is composed of a node controller 200, a memory unit 200, and a processor bus 110. The processor bus 110 connects with one or more processors 100. The nodes are connected to each other via a system connection unit to construct the ccNUMA-based SMP.

Figure 12:
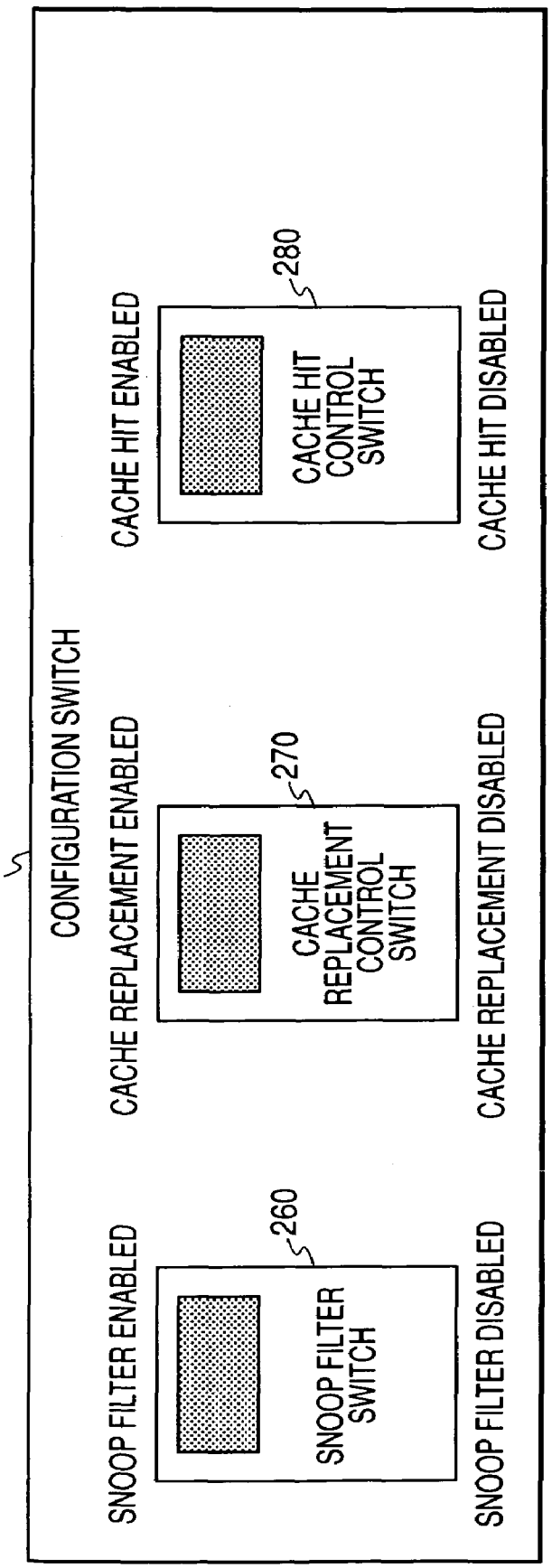
FIG. 12 is a conceptual diagram showing a configuration switch 250 for modification 2 of embodiment 1, and embodiments 2 and 3.

Each node controller 200 includes the configuration switch 250. The configuration switch 250 includes a snoop filter switch 260 as shown in FIG. 12. The snoop filter switch 260 is used to control the snoop filter. Turning off the snoop filter switch 260 disables the snoop filter and issues all snoop requests to the processor bus 500.

Figure 14:
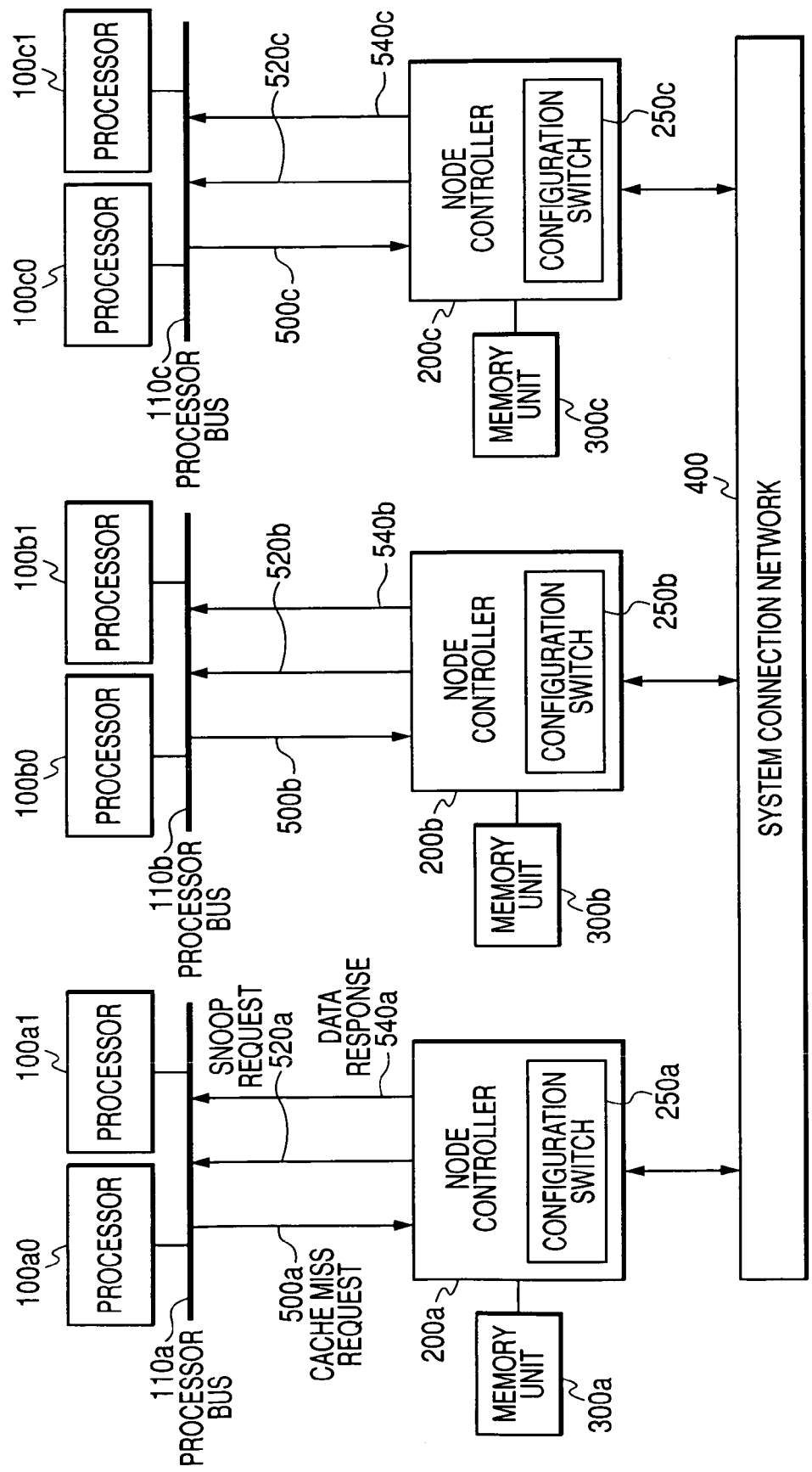
FIG. 14 is a block diagram showing the overall construction of embodiment 2 according to the invention.

FIG. 14 illustrates three nodes whose cores are node controllers 200a, 200b, and 200c. The three nodes are referred to as node a, node b, and node c. In the description to follow, reference numerals are followed by suffixes a, b, and c to distinguish between the nodes (omitting the suffix does not reference a specific node).

Let us suppose to enable snoop filter switches 260a and 260c for nodes a and c, and disable only a snoop filter switch 260b for node b. All lines are supposed to start from an uncached state. Node a is supposed to contain at least two processors 100a0 and 100a1.

Under these conditions, the processor 100a0 on node a issues a read request to an address corresponding to the memory unit 300a on node a. A cache miss request 500a is issued to a processor bus 110a. The node controller 200a issues a memory read request to the memory unit 300a and broadcasts a snoop request to nodes b and c. Since the snoop filter switch 260b is disabled, the node controller 200b on node b directly issues the received snoop request as a snoop request 520b to a processor bus 110b.

The node controller 200a awaits a snoop result from nodes b and c and then returns a data response 540a to the processor bus 110a. In this manner, the first read request is complete.

The processor 100a1 on node a issues a read instruction to the same address. At this time, the cache miss request 500a is issued as mentioned above. The node controller 200a issues a memory read request to the memory unit 300a and broadcasts a snoop request to nodes b and c. Since the invention hits the cache copy tag for node a, the node controller 200a can return the data response 540a to the processor bus 110a without awaiting the snoop result. Consequently, the second read instruction is completed faster than the first one.

Using this condition only is similar to the case where the node controller 200a caches the first read data. Then, the processor 100a0 on node a issues a read instruction to the address corresponding to the memory unit 300b on node b. After completion of the instruction, another processor 100a1 on node a issues a read instruction to measure the time until the instruction is complete. In this case, both instructions signify access to the remote node memory according to the invention. Even when the local node copy tag is hit, a data response from the memory becomes slower than the snoop result after all. The time until the completion is unchanged. When the node controller 200a caches the read data, access to the remote node memory should be fast. In this manner, the feature of embodiment 2 is being effective only for local node access.

The following describes a difference between the above-mentioned effect and the use of the directory-based protocol. The directory-based protocol makes it clear that no data is cached during a local node memory access. No snoop request is broadcast. Accordingly, the snoop request 520b is not issued to the remote node's processor bus 110b.

To further clarify the difference between the invention and the directory-based protocol, the processor 100a0 on node a issues a read invalidate instruction to the address corresponding to a memory unit 300c on node c. The node controller 200a receives the cache miss request 500a and broadcasts a memory read request to the memory unit 300c and a snoop request to nodes b and c. Since the snoop filter switch 260b is disabled for the node controller 200b on node b, the snoop request 520b is issued to the processor bus 110b. The node controller 200a receives a snoop response and a data response from nodes b and c and returns the data response 540a to the processor bus 110a. Action is taken to measure the time spent between issuance and completion of the instruction.

After completion of the first read invalidate instruction, the processor 100b0 belonging to node b issues a read instruction to the same address as before. The node controller 200b issues a memory read request to the memory unit 300c and a snoop request to nodes a and c. The node controller 200b receives a snoop request and a data response and then issues the data response 540b to the processor bus 110b.

After completion of the second read invalidate instruction, another processor 100a1 belonging to node a issues a read invalidate instruction to the same address as before. The time spent until completion of the instruction is compared with the time to complete the read invalidate instruction issued from the processor 100a0. When the invention is used, the processors 100a0 and 100a1 require the same time to complete the snoop for node b whose snoop filter switch is disabled. The completion times are almost the same. On the other hand, let us suppose that the directory-based protocol is used. When the processor 100a0 issues the read invalidate instruction, no node caches data to shorten the time until the completion. When the processor 100a1 issues the read invalidate instruction, the processor 100b0 already caches data to require extra time for the snoop to invalidate. Accordingly, the read invalidate instruction issued by the processor 100a1 requires more time to complete.

The second feature of embodiment 2 is that the memory access time does not vary with states of the remote node cache.

According to embodiment 2, the configuration switch 250 contains a cache hit control switch 280 that controls a cache hit. The cache hit control switch 280a in the node controller 200a is enabled to once clear the cache for initiation. The processor 100a0 on node a issues a read instruction to the address corresponding to the memory unit 300a on node a. After completion of the instruction, another processor 100a1 on node a issues a read instruction to the same address. Action is taken to measure the time spent until completion of the two read instructions. When the invention is used, the local node's cache copy tag is hit to complete the second read instruction in a shorter time period.

The cache hit control switch 280a in the node controller 200a is enabled to again clear the cache for initiation. The processor 100a0 on node a issues a read instruction to the address corresponding to the memory unit 300a on node a. After completion of the instruction, another processor 100a1 on node a issues a read instruction to the same address. Action is taken to measure the time spent until completion of the two read instructions. Since the invention is disabled, the node controller 200a cannon return the data response 540a in response to both read instructions without awaiting a result of the snoop request issued to the processor bus 10b on node b. As a result, the times to complete the two read instructions become almost the same.

As mentioned above, the third feature of embodiment 2 is being capable of changing cache hit operations depending on states of the cache hit control switch.

Embodiment 3

Embodiment 3 has basically the same system construction as embodiment 1. Similarly to embodiment 2, the configuration switch includes a snoop filter switch 2600 as shown in FIG. 12. The snoop filter switch can disable the snoop filter. That is, when a snoop request occurs, all the snoop requests can be issued to the processor bus 500. Accordingly, a change is made to the detail of Step 1400 for retrieving the remote node copy tag in the flow of the remote node snoop process in FIG. 22.

Figure 24:
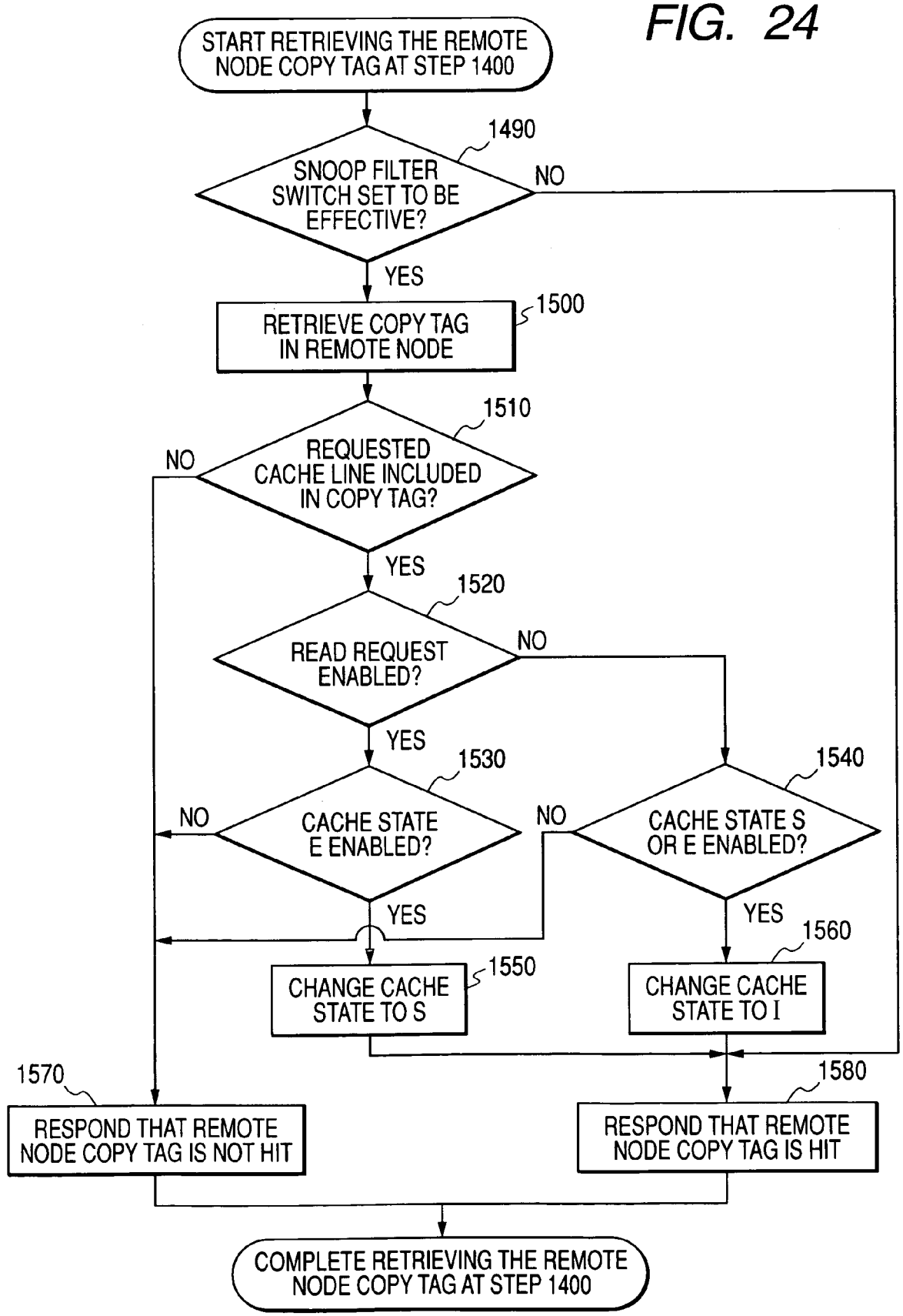
FIG. 24 is a detailed flowchart for "retrieve remote node copy tag" at Step 1400 in embodiment 3.

FIG. 24 shows a detailed flowchart of Step 1400 for retrieving the remote node copy tag according to embodiment 3. The remote node copy tag retrieval aims at determining whether or not the processor bus 120 needs to issue the snoop request 520. At Step 1490, the process determines whether or not the snoop filter switch is effective. When the snoop filter switch is ineffective, the process proceeds to Step 1580. When the snoop filter switch is effective, the process proceeds to Step 1500. At Step 1500, the process retrieves a remote node copy tag. At Step 1510, the process determines whether or not the copy tag includes a requested cache line. When the copy tag includes a requested cache line, the process proceeds to Step 1520. When the copy tag does not include a requested cache line, the process proceeds to Step 1570.

At Step 1520, the process determines whether or not the request is read. When the request is read, the process proceeds to Step 1530. Otherwise, the process proceeds to Step 1540.

At Step 1530, the process determines whether or not the cache state is E (exclusive). When the cache state is E (exclusive), the process changes the cache state to S at Step 1550 and then proceeds to Step 1580. Otherwise, the process proceeds to Step 1570.

At Step 1540, the process determines whether or not the cache state is S (shared) or E (exclusive). When the cache state is S (shared) or E (exclusive), the process changes the cache state to I at Step 1560 and the proceeds to Step 1580. When the cache state is neither S (shared) nor E (exclusive), the process proceeds to Step 1570.

At Step 1570, the process responds that the remote node copy tag is not hit. At Step 1580, the process responds that the remote node copy tag is hit. Either step completes the remote node copy tag retrieval at Step 1400.

Modification of Embodiment 3

Figure 25:
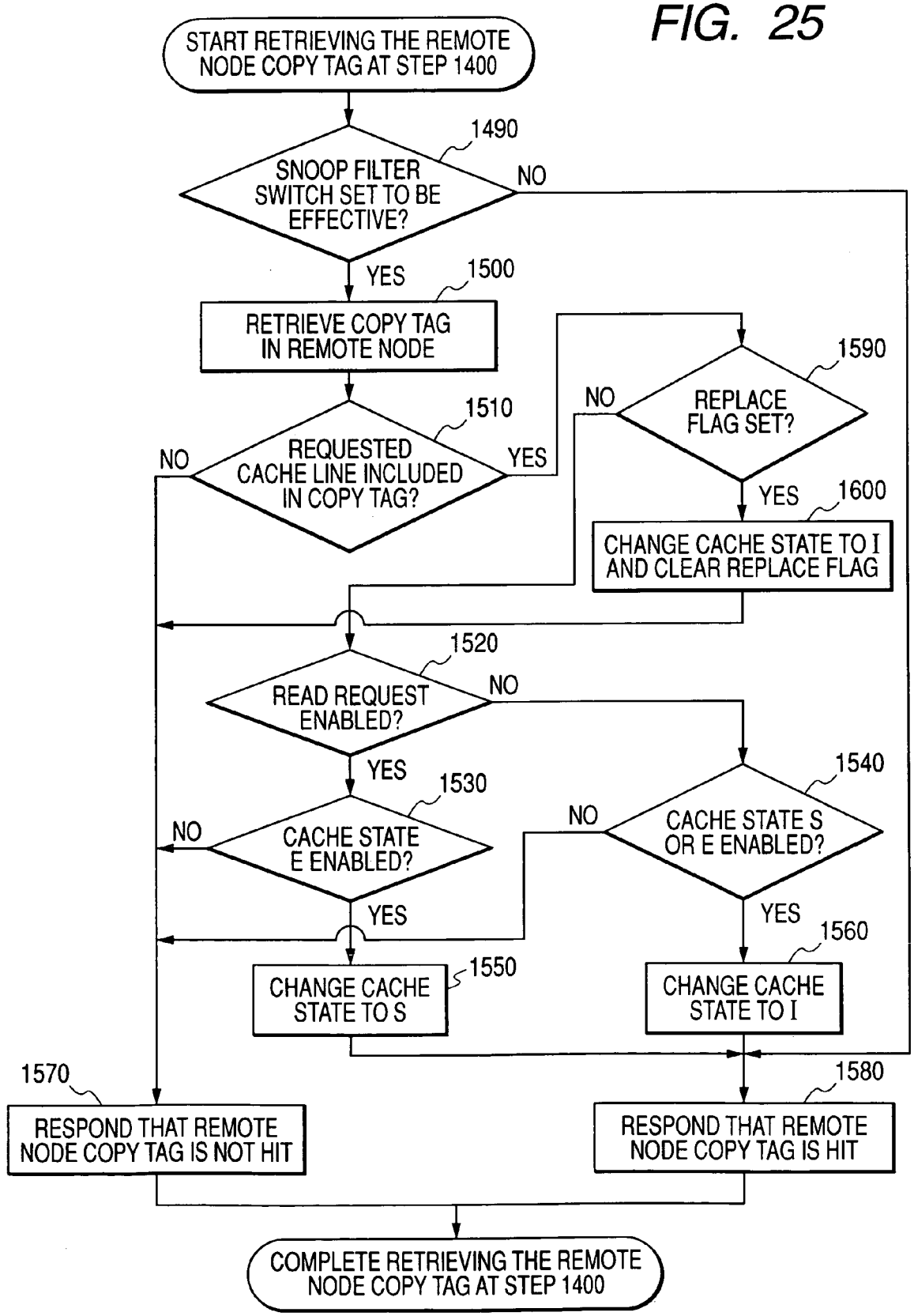
FIG. 25 is a detailed flowchart for "retrieve remote node copy tag" at Step 1400 in a modification of embodiment 3.

Similarly to modification 3 of embodiment 1 as mentioned above, embodiment 3 can also modify the cache copy tag 210 so as to have the replace flag 213 (FIG. 13). When this modification is used, the basic flow of the cache replacement process complies with FIG. 21 instead of FIG. 18 similarly to modification 3 of embodiment 1. FIG. 25 shows a detailed flowchart of the remote node copy tag retrieval (Step 1400 in FIG. 22).

The flowchart in FIG. 25 differs from the flowchart of FIG. 24 in that a change is made to the operation for step 1510 of determining whether or not the copy tag contains a requested cache line. When the copy tag does not contain a requested cache line, the process proceeds to Step 1570 similarly to the basic flow. When the copy tag contains a requested cache line, the process proceeds to Step 1590. At Step 1590, the process determines whether or not the replace flag 213 is set for the relevant entry. When the replace flag 213 is set, the process proceeds to Step 1600. Otherwise, the process proceeds to Step 1520. The subsequent process is the same as the flow in FIG. 24. At Step 1600, the process changes the cache state to I (invalid) and clears the replace flag 213. The process then proceeds to Step 1570 and responds that the remote node copy tag is not hit. According to the above-mentioned sequence of operations, the entry with the replace flag set behaves so as to hit the local node copy tag retrieval and not to hit the remote node copy tag retrieval. In this manner, an unnecessary snoop request is not issued to the processor bus when the remote node requests the caching. The modification provides an effect of shortening the latency when a cache miss recurs for the cache line replaced by the local node. This is similar to modification 3 of embodiment 1.

As mentioned above, the invention can be applied to the multi-processor system composed of multiple nodes.

What is claimed is:

1. A cache coherency control method for a multi-processor system, in which the multi-processor system includes multiple nodes connected to each other via a system connection network, each node includes one or more processors, a node controller connected to the processors via a processor bus, and a memory unit, each memory unit has one of a plurality of main storage portions constituting part of a main storage shared by processors of the plurality of nodes, the processor has a cache to hold data retrieved from the memory unit, and the cache coherency control method comprising the steps of:

holding, by each node controller, an address tag for data maintained in the cache of the processor, a cache copy tag for maintaining a cache state, and a cache copy tag management unit for managing the cache copy tag;

receiving, by a first node controller of the node controllers, a cache miss request from the processor connected to the first node controller via the processor bus, broadcasting, by the first node controller, a snoop request to a second node controller of the node controllers other than the first node controller via the system connection network;

determining, by the first node controllers, whether a snoop response corresponding to the snoop request is returned from one of the second node controllers;

retrieving, by the first node controller, the cache copy tag held in the first node controller;

issuing, by the cache copy tag management unit, an advanced response notification, via the processor bus to the processor, when the address is registered in the cache copy tag of the first node controller; and returning, by the first node controller, a response data obtained from the memory unit, via the processor bus, to the processor without a wait for counting a snoop result as a response of the broadcast snoop request from the second node controllers, when the snoop responses are collected from the second node controllers, counting, by the first node controller, a snoop result on the basis of the snoop responses.

2. The cache coherency control method for a multi-processor system according to claim 1, wherein the cache copy tag has at least three cache states such as I indicating no cache, S indicating shared state, and E indicating exclusive state; and wherein, when the processor issues a cache miss request for allowing shared state and retrieving the cache copy tag for the first node results in cache state S or E for a relevant address, or when the processor issues a cache miss request for allowing only exclusive state and retrieving the cache copy tag for the requesting node results in cache state E for a relevant address, the cache copy tag is assumed to be hit and response data obtained from the memory unit is returned to the processor without wait for counting a snoop result for the broadcast snoop request.

3. The cache coherency control method for a multi-processor system according to claim 2, wherein, when data is excluded from the cache of the processor, there is provided means for identifying to which node a memory unit maintaining the data belongs;

wherein, when the memory unit does not belong to a node excluded from the cache, a relevant entry of the cache copy tag is provided with a cache state changed to I; and wherein, when the memory unit belongs to a node excluded from the cache, a relevant entry of the cache copy tag is provided with a cache state unchanged.

4. The cache coherency control method for a multi-processor system according to claim 2, wherein the first node controller includes a cache replacement control switch; and wherein, when data is excluded from the cache of the processor, a state of the cache replacement control switch specifies whether or not to change a cache state for a relevant entry of the cache copy tag.

5. The cache coherency control method for a multi-processor system according to claim 2, wherein each entry of the cache copy tag includes not only an address tag and a cache state, but also a replace flag to indicate that data is excluded;

wherein, when the processor caches data in accordance with a cache miss request from the processor, the replace flag for the entry is cleared;

wherein, when data is excluded from the cache of the processor, the replace flag is set for an entry corresponding to the data in the cache copy tag; and wherein, when the replace flag is set during retrieval of the cache copy tag in accordance with a snoop request from a remote node, cache state I is responded independently of cache states and, when the cache copy tag is retrieved in accordance with a cache miss request from the first node controller, the cache state is responded even though the replace flag is set.

6. A multi-processor system comprising:

one or more processors, one or more memory units, a node controller to connect among them, and a plurality of nodes connected to each other via a system connection unit, wherein each memory unit has one of a plurality of main storage portions constituting part of a main storage shared by processors of the plurality of nodes;

wherein the processor issues at least two types of access instructions to the memory unit, i.e., a read instruction capable of allowing a processor cache to share data with another processor cache and a read invalidate instruction capable of sharing another processor cache;

wherein each node controller has one or more configuration switches;

wherein configuration switch has a snoop filter switch to control a snoop operation for the processor included in the node;

wherein the snoop filter switch, when enabled, and when no snoop is needed for a processor on a remote node in response to a snoop transaction issued from the node, issues no snoop to the processor bus and, when disabled, surely issues a snoop to the processor bus;

wherein a first node has at least two processors;

wherein, when a snoop filter is disabled only for a snoop filter switch of a second node, a first processor belonging to the first node issues a read instruction to an address corresponding to the memory unit for the first node;

wherein a snoop transaction is issued to an address corresponding to the processor bus for the second node;

wherein data is then responded to a read instruction requested on the processor bus for the first node;

wherein a second processor belonging to the first node then issues a read instruction to the same address;

wherein, in this case, data in response to the read instruction issued from the second processor is responded to the processor bus for the first node in a shorter time period than required for the read instruction issued from the first processor;

wherein the first processor belonging to the first node issues a read instruction to an address corresponding to the memory unit of the second node;

wherein a snoop transaction is issued to an address corresponding to the processor bus for the second node;

wherein data is then responded to a read instruction requested on the processor bus for the first node;

wherein a second processor belonging to the first node then issues a read instruction to the same address; and wherein, in this case, data in response to the read instruction issued from the second processor is responded to the processor bus for the first node in the same time period as required for the read instruction issued from the first processor.

7. The multi-processor system according to claim 6, wherein there is provided a third node in addition to the first and second nodes;

wherein a first processor belonging to the first node issues a read invalidate instruction to an address corresponding to a relevant memory unit of the third node;

wherein a snoop transaction is issued to an address corresponding to the processor bus for the second node;

wherein data is then responded to a read invalidate instruction requested on the processor bus for the first node;

wherein a second processor belonging to the second node then issues a read instruction to the same address as the read invalidate instruction;

wherein data is responded to a read instruction requested on the processor bus for the second node;

wherein a second processor belonging to the first node further issues a read invalidate request to the same address as used for the first processor to issue the instruction; and wherein, in this case, data in response to the read invalidate instruction issued from the second processor is responded to the processor bus for the first node in the same time period as required for the read invalidate instruction issued from the first processor.

8. The multi-processor system according to claim 6, wherein the node controller includes a cache hit control switch as a relevant setup switch;

wherein, when first and second nodes are provided, the first node has at least two processors;

wherein a snoop filter is disabled only for a snoop filter switch of the second node;

wherein a first processor belonging to the first node issues a read instruction to an address corresponding to the memory unit of the first node;

wherein a snoop transaction is issued to an address corresponding to the processor bus for the second node;

wherein data is then responded to a read instruction requested on the processor bus for the first node;

wherein a second processor belonging to the first node then issues a read instruction to the same address;

wherein, when the cache hit control switch is enabled, data in response to the read instruction issued from the second processor is responded to the processor bus for the first node in a shorter time period than required for the read instruction issued from the first processor; and wherein, when the cache hit control switch is disabled, data in response to the read instruction issued from the second processor is responded to the processor bus for the first node in the same time period as required for the read instruction issued from the first processor.

9. A cache coherency control method for a multi-processor system having a plurality of nodes that are connected with each other via a system connection unit and each include a processor bus connecting with one or more processors and a node controller connecting with one or more memory units, wherein each node controller has a cache copy tag to maintain address tags and cache states of all addresses cached by a processor belonging to a local node; and wherein the cache coherency control method comprises the steps of:

determining whether or not an inter-cache transfer occurs as a result of local node snooping when a cache miss causes a memory access request to be issued to a processor bus;

issuing a memory read request to memory corresponding to a relevant address in case of no inter-cache transfer occurred and broadcasting a snoop request to each node;

retrieving a relevant cache copy tag for a local node and determining whether or not there is an entry corresponding to the address;

determining whether or not a cache state is exclusive when an entry is found;

determining whether or not a cache state is shared, when not exclusive, and a requested cache miss permits shared state;

skipping a step of awaiting a snoop result from each node in case of presence of the entry and awaiting data returned from memory;

awaiting a snoop result form each node;

determining whether or not memory contains most recent data in accordance with a snoop result from each node; and awaiting data returned from memory in case of presence of most recent data in memory;

awaiting inter-cache transfer data returned from memory in case of absence of most recent data in memory; and returning returned data to a processor.

10. The cache coherency control method according to claim 9, wherein the node controller has a cache replacement control switch to enable or disable cache replacement; and wherein, when the cache replacement control switch is enabled during replacement from the cache, the cache coherency control method includes the step of invalidating a cache state of an entry corresponding to the cache copy tag.

11. The cache coherency control method according to claim 9 comprising the steps of:

determining a memory position in the cache during replacement from the cache; and invalidating a cache state of an entry corresponding to the cache copy tag when the memory position indicates a remote node.

12. The cache coherency control method according to claim 9, wherein an entry of the cache copy tag includes a replace flag indicating a replaced line; and wherein the cache coherency control method comprises the steps of:

clearing the replace flag to ensure an entry in the cache copy tag;

setting a replace flag for an entry corresponding to the cache copy tag during replacement from the cache;

determining whether or not the cache copy tag contains a requested cache line when a request for cache copy tag retrieval arrives from a remote node;

determining whether or not the replace flag is set when the cache copy tag contains a requested cache line;

invalidating the cache state when the replace flag is set, clearing the replace flag, and responding unsuccessful retrieval hit; and responding successful retrieval hit when the replace flag is not set.

13. A first node controller coupled, via a processor bus, to a processor which includes a cache, and coupled to, via a system connection network, a memory unit and a second node controller, comprising:

a transaction generation unit which receives a cache miss request from a processor via a processor bus and broadcasts a snoop request, via a system connection network, to second node controllers other than the first node controller;

a transaction reception unit which receives a snoop response from the second node controllers via the system connection network;

a cache copy tag management unit which holds an address tag for data maintained in the cache of the processor, and a cache copy tag for maintaining a cache state, wherein the cache copy tag management unit is arranged to manage the cache copy tag and retrieve the cache copy tag, and to issue an advanced response notification via the processor bus to the processor when the address is registered in the cache copy tag; and a data response control unit which returns, via the processor bus, to the processor, a response data corresponding to the cache miss request, without a wait for counting a snoop result as a response of the broadcast snoop request from the second node controllers via the system connection network, the response data being obtained from the memory unit.

14. The first node controller according to claim 13, wherein the cache copy tag has at least three cache states such as I indicating no cache, S indicating shared state, and E indicating exclusive state; and wherein, when the processor issues a cache miss request for allowing shared state and retrieving a cache copy tag for a requesting node results in cache state S or E for a relevant address, or when the processor issues a cache miss request for allowing only exclusive state and retrieving the cache copy tag for a requesting node results in cache state E for a relevant address, the cache copy tag is assumed to be hit and response data returned from the memory unit is returned to the processor without wait for counting a snoop result for the broadcast snoop request.

15. The first node controller according to claim 14, wherein, when data is excluded from a cache of the processor, there is provided means for identifying to which node a memory unit maintaining the data belongs;

wherein, when the memory unit does not belong to a node excluded from the cache, a relevant entry of the cache copy tag is provided with a cache state changed to I; and wherein, when the memory unit belongs to a node excluded from the cache, a relevant entry of the cache copy tag is provided with a cache state unchanged.

16. The first node controller according to claim 14, wherein the node controller includes a cache replacement control switch; and wherein, when data is excluded from a cache of the processor, a state of the cache replacement control switch specifies whether or not to change a cache state for a relevant entry of the cache copy tag.

17. The first node controller according to claim 14, wherein each entry of the cache copy tag includes not only an address tag and a cache state, but also a replace flag to indicate that data is excluded;

wherein, when the processor caches data in accordance with a cache miss request from the processor, the replace flag for the entry is cleared;

wherein, when data is excluded from the cache of the processor, the replace flag is set for an entry corresponding to the data in the cache copy tag; and wherein, when the replace flag is set during retrieval of the cache copy tag in accordance with a snoop request from a remote node, cache state I is responded independently of cache states and, wherein, when the cache copy tag is retrieved in accordance with a cache miss request from a local node, the cache state is responded even though the replace flag is set.

* * * * *